US006331970B1

(12) United States Patent
Nieh et al.

(10) Patent No.: US 6,331,970 B1
(45) Date of Patent: Dec. 18, 2001

(54) DYNAMIC GENERIC CELL RATE ALGORITHM FOR POLICING ABR TRAFFIC

(75) Inventors: Benjamin B. Nieh, Ottawa; John F. Pillar; Jacob Guttman, both of Nepean; Bernard Marchand, Cantley; Sameh Rabie, Kanata, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/220,857

(22) Filed: Dec. 28, 1998

(51) Int. Cl.$^7$ .................................................. H04L 12/56
(52) U.S. Cl. ........................................... 370/230; 370/395
(58) Field of Search .................................... 370/230, 231, 370/232, 233, 234, 235, 389, 395; 709/240

(56) References Cited

U.S. PATENT DOCUMENTS

| | | | |
|---|---|---|---|
| 5,745,477 | * | 4/1998 | Zheng et al. ........................... 370/230 |
| 5,864,539 | * | 1/1999 | Yin ......................................... 370/336 |
| 5,910,942 | * | 6/1999 | Grenot et al. ......................... 370/236 |
| 5,926,459 | * | 7/1999 | Lyles et al. ........................... 370/230 |
| 5,940,368 | * | 8/1999 | Takamichi et al. ................... 370/229 |
| 6,049,526 | * | 4/2000 | Radhakrishnan et al. ........... 370/229 |
| 6,072,989 | * | 6/2000 | Witters et al. ....................... 455/67.1 |
| 6,084,857 | * | 7/2000 | Takamichi ............................ 370/236 |
| 6,097,701 | * | 8/2000 | Grunenfelder et al. ............. 370/235 |
| 6,175,568 | * | 1/2001 | Awdeh .................................. 370/395 |

OTHER PUBLICATIONS

ATM Forum Technical Committee, "Traffic Management Specification, Version 4.0", af–tm–0056.000, Apr. 1996.

* cited by examiner

*Primary Examiner*—Douglas Olms
*Assistant Examiner*—Ken Vanderpuye

(57) ABSTRACT

In an ATM communication system, a source transmitting in accordance with an Available Bit Rate service category must be policed to ensure that the cells are transmitted at a rate within the cell rate specified by the network at any given time. The usage parameter control system can only store a limited number of pending cell transmission rates to be enforced, and must make approximations by discarding certain stored pending cell transmission rates in order to make room for new cell transmission rates. This invention is directed towards a method for selecting which stored cell rates to discard that allows less cheating room in the cell rate enforcement than does the prior art, and that does not over-police.

25 Claims, 16 Drawing Sheets

DYNAMIC GENERIC CELL RATE ALGORITHM FOR POLICING ABR TRAFFIC

FIELD OF THE INVENTION

This invention relates generally to the policing of Available Bit Rate (ABR) traffic in Asynchronous Transfer Mode (ATM) communication systems.

BACKGROUND OF THE INVENTION

In an ATM system, the traffic from a source is transmitted in fixed-length packets called cells, containing data and header information. The cells from different sources are interleaved and transmitted along a single link. The interleaving is non-uniform, in that more cells from a particular source may be interleaved per unit time than from a second source. This allows traffic from different types of sources to use only as much bandwidth as is needed, and provides much more efficient use of the total available bandwidth. The ATM network should allocate bandwidth to the different sources of traffic according to how fast each source needs to transmit information and the desired Quality of Service (QoS). This will depend on the type of information being transmitted, and on what the user is willing to pay for.

The Connection Admission Control (CAC) mechanism of the network is responsible for determining if a connection request can be accepted. When a source attempts to make a connection to the ATM network it will specify a service category and negotiate a traffic contract with the network. The traffic contract consists of a connection traffic description, a service category, a set of QoS parameters, and a conformance definition. The connection traffic description contains two parts: a source traffic descriptor which characterizes the source traffic using a set of rate and burstness related parameters, including the Peak Cell Rate (PCR) and the Minimum Cell Rate (MCR); and the Cell Delay Variation Tolerance (CDVT) which is to be used by the network at the User-Network Interface (UNI) to account for the amount of Cell Delay Variation (CDV) when monitoring the user traffic. The negotiated QoS parameters (some parameters are not negotiated) can include the Peak-to-peak Cell Delay Variation (CDV), the Maximum Cell Transfer Delay (CTD), and the Cell Loss Ratio (CLR). The conformance definition identifies a set of predefined rules which unambiguously specify the conforming cells of the connection. If the source and the network reach agreement on the QoS for the requested traffic descriptor and service category, a connection is established.

The service category specifies broadly the manner in which the cell transmission rate is to vary, if at all. One of the possible service categories is Available Bit Rate (ABR). In ABR additional parameters are negotiated at call set-up: the Initial Cell Rate (ICR), the ADTF (described below), the RIF (described below), and the RDF (described below). In ABR the user requests a Minimum Cell Rate (MCR) and specifies a Peak Cell Rate (PCR) and an Initial Cell Rate (ICR). The CAC evaluates the capacity of the network and the current traffic on the network to determine if this minimum cell rate can be guaranteed to the user. In the meantime, network elements may directly modify the ICR to a lower value if needed, and provide delay and buffer space information which enables the source to recompute an updated ICR which should be no higher than the ICR originally requested by the source. If the MCR can be guaranteed, a connection will be established and the source can begin transmitting at the updated ICR. During transmission the available bandwidth in the network may decrease due to higher bandwidth consumption by services that enjoy a higher service priority than ABR, and the source will be instructed to lower its cell transmission rate. At other times more capacity may become available due to the dropping of other calls or the variation of cell rate of other connections. In effect, the source is always allowed to transmit cells at the MCR, but can transmit cells at a higher rate as bandwidth becomes available. ABR is not intended to support real-time applications. The QoS can remain unspecified since Cell Delay Variation and Cell Transfer Delay are unimportant, and the Cell Loss Ratio is expected to be very low as long as the source transmits within the cell rate specified at any given time by the network. The negotiation at connection set-up of an ABR call consists simply of a request by the source for a connection based on a specified MCR and PCR, and a determination by the network as to whether it can offer a very low CLR for the specified MCR. If it can, the CAC system will inform the source that it can offer a cell transmission rate at least as great as the MCR, and a very low CLR as long as the source complies with the cell transmission rate specified by the network from time to time.

During the transmission, the source must be informed of any changes in its Allowed Cell Rate (ACR), the rate at which the source is allowed to transmit cells at any given time. This is done actively by the source, which periodically polls the network to determine the ACR. The frequency with which this is done is determined by the value of Nrm, a parameter negotiated during call set-up. This is the maximum number of cells that the source can transmit for each Forward Resource Management (F-RM) cell. A F-RM cell is transmitted by the source to convey resource management information between the source, the network elements, and the destination. It carries a requested cell rate value (typically the PCR) in the cell's Explicit Rate (ER) field. When the F-RM cell reaches the destination, it is turned around and sent back to the source as a Backward Resource Management (B-RM) cell, carrying feedback information provided by the network elements and the destination. As the B-RM cell passes through each network element on its way back to the source, the network element compares the value in the ER field of the B-RM cell with the cell rate that the network element can offer. If the network element can only offer a cell rate less than the value contained in the ER field, the network element substitutes its offered cell rate for that in the B-RM cell. One type of network element, a binary switch, is not capable of providing exact ER information. Instead, a binary switch examines its buffer to derive congestion information and indicates to the source indirectly that it should perform a relative rate increase or decrease. If the binary switch detects congestion it sets the Explicit Forward Congestion Indication (EFCI) state of the data cell to "1" by altering the Payload Type Identifier field in the header of the data cell. The EFCI of each data cell is monitored by the destination. When the destination receives a new F-RM cell it checks whether the EFCI state of the immediately preceding data cell was "1". If so, the destination sets the Congestion Indication (CI) and No Increase (NI) fields of the B-RM cell to "1".

By the time the B-RM cell returns to the source it carries the value of the lowest cell rate offered by any of the network elements and carries binary flags indicating if there is congestion in any binary switches. The source computes its ACR as the minimum of the Explicit Rate (ER) offered by the network and a locally computed rate which is a function of the previous ACR, the presence of congestion in the network as indicated by the CI and NI fields in the B-RM cell, and the Rate Increase Factor (RIF) and Rate Decrease Factor (RDF) negotiated during call set-up. The computed ACR is the cell rate at which the source should then transmit, as it is the highest bandwidth that the network as a whole can guarantee for the connection.

An honest source will adapt its transmission rate to match the ACR, thereby ensuring a low CLR and usage of its fair share of the overall available bandwidth. However non-compliant sources will transmit cells at a rate higher than the ACR in hopes of obtaining a higher share of the bandwidth than that to which they are entitled. To prevent this the network must carry out a function called policing. Policing is carried out at the User Network Interface (UNI) Usage Parameter Control (UPC) which a set of traffic monitor and control functions. When a B-RM cell leaves the network through the UNI on its way to the source, the UPC takes note of the ER contained in the B-RM cell. Thereafter the UPC polices the traffic from the source and enforces the allowed rate in order to prevent the source from abusing the network. Traffic policing in general has two aspects: detecting excessive cells that do not conform to the rate limits provided by the network; and taking actions against the non-conforming cells that are detected. In ABR the only action available upon detection of non-conforming cells is the discarding of the non-conforming cells.

The source is expected to poll the network for a new ER at a minimum frequency. Otherwise the source, upon being instructed of a particularly high ACR at some point, could take advantage of this extra bandwidth indefinitely by transmitting no more F-RM cells. If no F-RM cells were transmitted then the UPC would see no new B-RM cells and would continue to police at the high cell rate even though available bandwidth may have dropped. The source would be using more than its fair share of network bandwidth indefinitely. To avoid this, the frequency at which F-RM cells are transmitted is regulated. The Nrm is a parameter specifying the maximum number of cells that a source may send for each F-RM cell. The network dynamically allocates unused bandwidth to active connections to achieve high resource utilization. A source which has a high ACR but actually transmits at a very low rate or remains idle for a long period of time will have its unused bandwidth quota allocated to others by the network. To prevent this source from suddenly transmitting at the high ACR rate and overloading the network, the ACR Decrease Time-out Factor (ADTF) is defined as the maximum time permitted between sending F-RM cells before the source is required to lower its rate to ICR, if the current ACR is greater than ICR. The Nrm and ADTF are part of the ABR set-up parameters negotiated at call set-up.

The standard algorithm used by the UPC to detect excess cell rates is called the Generic Cell Rate Algorithm (GCRA). The ATM Forum Technical Committee has proposed two equivalent versions of the GCRA for detecting cells that exceed a policed rate. These algorithms are provided in section 4.4.2 of the ATM Forum Traffic Management Specification, Version 4.0 (the "ATM Forum"). If the rate to be policed varies with time, as is the case with ABR traffic, then the GCRA must be dynamic. Two Dynamic GCRAs (DGCRAs) are proposed for ABR policing in Informative Appendix III of the ATM Forum, and are discussed in more detail below.

If the UPC could enforce a new ER immediately upon being informed of the new ER (by reading the B-RM cell) then the algorithm for enforcing the ER would be relatively straightforward. The UPC would simply vary the parameters of the DGCRA immediately upon learning of a new ER to be enforced. However the UPC must delay enforcement of a new ER because time must elapse between the time of detection of the new ER by the UPC and the time that the effects of the new ER appear at the UPC on the forward link from the source. This response delay must account for the time necessary for the B-RM cell containing the new ER to propagate along the transmission medium from the UNI to the source, the time necessary for the source to adapt its transmission rate after processing the new ER information and calculating its ACR, and the time necessary for the first cells transmitted at the new computed ACR to propagate along the transmission medium from the source to the UNI. Only then should the UPC begin enforcing the new ER. The delay time is calculated by the UPC based on the network configuration, and is bounded by an upper limit $\tau_2$ and a lower limit $\tau_3$. These two limits could be obtained through measurement statistics. Any doubt as to when to begin enforcement of the new ER is resolved in favour of the user. If the ER is decreasing from its previous value then the UPC will delay enforcement of the new ER by the upper delay limit in order to ensure that cells transmitted by an honest source are not rejected before the source has had a chance to put the new ER into effect. If the ER is increasing from its previous value then the UPC will delay enforcement of the new ER by the lower delay limit, in case the honest source puts the new ER into effect in the shortest time possible.

As described above, a new ER typically becomes available every Nrm−1 data cells, where according to the ATM Forum the default value of Nrm is 32. With high speed transmission and typical delay times, it is almost inevitable that a second new ER will become available before enforcement of an earlier new ER has begun. For example, consider a UPC enforcing a current Policing Rate (PR). At some time $t_b(i)$ a B-RM cell reaches the UPC indicating that a new ER (ER(i)) is available. The UPC determines that this is a decrease in ER (for example) and schedules an enforcement time of $t(i)=t_b(i)+\tau_2$, where $\tau_2$ is the upper limit of the response delay. At some later time $t_b(i+1)$ a second B-RM cell reaches the UPC indicating that a second new ER (ER(i+1)) is available. This is an increase in ER (for example) from the value of ER(i), so the UPC schedules an enforcement time of $t(i+1)=t_b(i+1)+\tau_3$, where $\tau_3$ is the lower limit of the response delay. If $t_b(i+1)<t(i)$ then enforcement of ER(i) has not yet begun. The UPC could simply discard the value of ER(i) and $t(i)$ and replace them with ER(i+1) and $t(i+1)$. The preferable solution is to store the values of both sets of pending enforcements. It should be noted that a time sequence anomaly can arise because of the response delays, if $\tau_2$ and $\tau_3$ are sufficiently far apart and consecutive B-RM cells arrive sufficiently close together. If a rate decrease is followed closely by a rate increase, such that $t_b(i+1)+\tau_3<t_b(i)+\tau_2$, then $t(i+1)<t(i)$ and enforcement of ER(i+1)would be scheduled to begin before enforcement of ER(i). This is not necessarily a problem, but the UPC must monitor for this anomaly.

In an ideal system the UPC would store the values of all the pending ERs and their enforcement times, and enforce each one as required. This is in fact what is proposed by the ATM Forum as Algorithm A. Depending on the response delay and link speed, the number of pending ERs and corresponding enforcement times could range from on the order of 10 to on the order of 1000. The storage of this many ERs and their enforcement times is impractical.

The ATM Forum has proposed a second DGCRA called Algorithm B, in which only two pending ERs and their enforcement times are stored. This is a compromise because as less ER information is stored, the more approximations must be made in determining the ER to enforce at any given time and the larger the potential margin between the actual ER offered by the network and the rate at which the UPC is policing. Industry has accepted this compromise of storing two pending ERs. Algorithm B must necessarily be over generous at times when making its approximations. For honest sources this is not a concern, as they will transmit only at the ER at which they have been instructed to transmit. But non-conforming sources will be able to transmit cells at a higher ER than at which they have been instructed to transmit without being detected. This is termed "cheating", and the amount of excess traffic that can be transmitted (between the ER and the over generous policed rate) is termed the "cheating room".

It is desirable to limit the cheating room as much as possible. J. Adams has proposed an improvement over Algorithm B, called Improved Algorithm B (J. Adams, "Improved Algorithm B for ABR Conformance", ATM Forum contribution 96-616R2, BT, April 1996). This somewhat reduces the amount of cheating room, although there is still room for improvement. And Improved Algorithm B in fact over-polices in some situations. Cells from honest sources can be discarded unnecessarily, as illustrated in more detail below.

Source behaviour #8 specified in the ATM Forum requires that ABR sources account for binary-oriented relative rate changes. Binary switches react to bandwidth changes in the network considerably slower than non-binary (ER) switches. As a result, the rate change required by binary switches and that by ER switches can be different. If the rate offered by ER switches is higher than the rate computed according to binary feedback information in the CI and NI fields, and if UPC only enforces ER, an abusive user can take advantage of the difference and sends traffic at ER without being detected. The excessive traffic sent by the abusive user gives the user an unfair bandwidth advantage over conforming users and can result in congestion. Abusive users can take advantage of the rate difference if there is only policing of the rate indicated by the ER switches. Neither Algorithm B nor Improved Algorithm B makes use of rate changes required by binary switches when setting the policed cell rates, and both allow the source to transmit at the ER offered by non-binary switches without considering the rate change requested by binary switches. There is therefore room for further reduction of the cheating room in paths containing binary switches.

SUMMARY OF THE INVENTION

It is an object of the present invention to provide apparatus and a method which allow improved policing of the ER in an ABR connection in an ATM communication system by better selection of which pending ERs and their associated enforcement times to store in memory and which pending ERs and enforcement times to discard, and by more refined rate control taking binary-oriented relative rate changes into account. The invention allows less non-conforming traffic to pass through the UPC and does not over-police conforming traffic.

Broadly, the invention may be summarized as a method for policing the cell transmission rate of traffic from a variable cell transmission rate source in a cell relay communication system in which the source is informed of a new explicit cell transmission rate (ER) periodically and the communication system enforces the ER after a response delay, the method comprising the steps of: ensuring that traffic from the source complies with a current policed cell transmission rate (PR), storing a first stored ER (ER1), storing a first stored enforcement time defined as the time at which enforcement of ER1 begins, storing a second stored ER (ER2), storing a second stored enforcement time defined as the time at which enforcement of ER2 begins, the second stored enforcement time being greater than or equal to the first stored enforcement time, monitoring for a new ER to be enforced, and upon detecting a new ER to be enforced, the further steps of: determining a tentative enforcement time for the new ER, comparing the PR, the first stored ER (ER1), the second stored ER (ER2), and the new ER, if ER1 is greater than ER2 and if ER2 is greater than the new ER, or if the new ER is greater than ER1 and ER1 is greater than ER2, carrying out at least one first additional step to adjust the values of the stored ERs and the stored enforcement times, if ER1 is greater than the new ER and the new ER is greater than ER2, carrying out at least one second additional step to adjust the values of the stored ERs and the stored enforcement times, if the PR is greater than ER2 and ER2 is greater than ER1, or if ER2 is greater than ER1 and ER1 is greater than the PR, carrying out at least one third additional step to adjust the values of the stored ERs and the stored enforcements times, and if ER2 is greater than the PR and the PR is greater than ER1, carrying out at least one fourth additional step to adjust the values of the stored ERs and the stored enforcement times.

According to another aspect, the invention provides a method for policing the cell transmission rate of traffic from a variable cell transmission rate source in a cell relay communication system in which the source is informed of a new explicit cell transmission rate (ER) periodically and the communication system enforces the ER after a response delay, the method comprising the steps of: ensuring that traffic from the source complies with a current policed cell transmission rate (PR), storing a plurality of stored ERs, storing a plurality of stored enforcement times defined as the time at which enforcement of a corresponding stored ER begins, monitoring for a new ER to be enforced, and upon detecting a new ER to be enforced, the further steps of: determining a tentative enforcement time for the new ER, comparing the PR, the stored ERs, and the new ER, determining to which of a set of pre-determined permutation groupings the relative values of the PR, the stored ERs, and the new ER belong, carrying out an additional set of pre-determined steps to adjust the values of the stored ERs and the stored enforcement times, the choice of which set of additional steps to carry out being dependent on the permutation grouping to which the relative values of the PR, the stored ERs, and the new ER belong.

According to yet another aspect, the invention provides a method for policing the cell transmission rate of traffic from a variable cell transmission rate source in a cell relay communication system in which the source is informed of a new explicit cell transmission rate (ER) periodically and the communication system enforces the ER after a response delay, the method comprising the steps of: ensuring that traffic from the source complies with a current policed cell transmission rate (PR), storing a plurality of stored ERs including a last stored ER, storing a plurality of stored enforcement times defined as the time at which enforcement of a corresponding stored ER begins, monitoring for a new ER to be enforced, and upon detecting a new ER to be enforced, the further steps of: adjusting the new ER to account for congestion in the network, determining a tentative enforcement time for the new ER, and storing the new ER and the tentative enforcement time.

BRIEF DESCRIPTION OF THE DRAWINGS

The invention will now be described in greater detail with reference to the accompanying diagrams, in which:

FIG. 3 is a diagram of every permutation of relative rates to be enforced;

FIG. 5b is a detailed flowchart of one step in the flowchart of FIG. 5a;

FIG. 6 is a diagram of the effect of Algorithm B for every permutation of relative rates to be enforced;

FIG. 9b is a detailed flowchart of one step of the flowchart of FIG. 9a;

DETAILED DESCRIPTION OF THE PREFERRED EMBODIMENTS

Figure 1A:
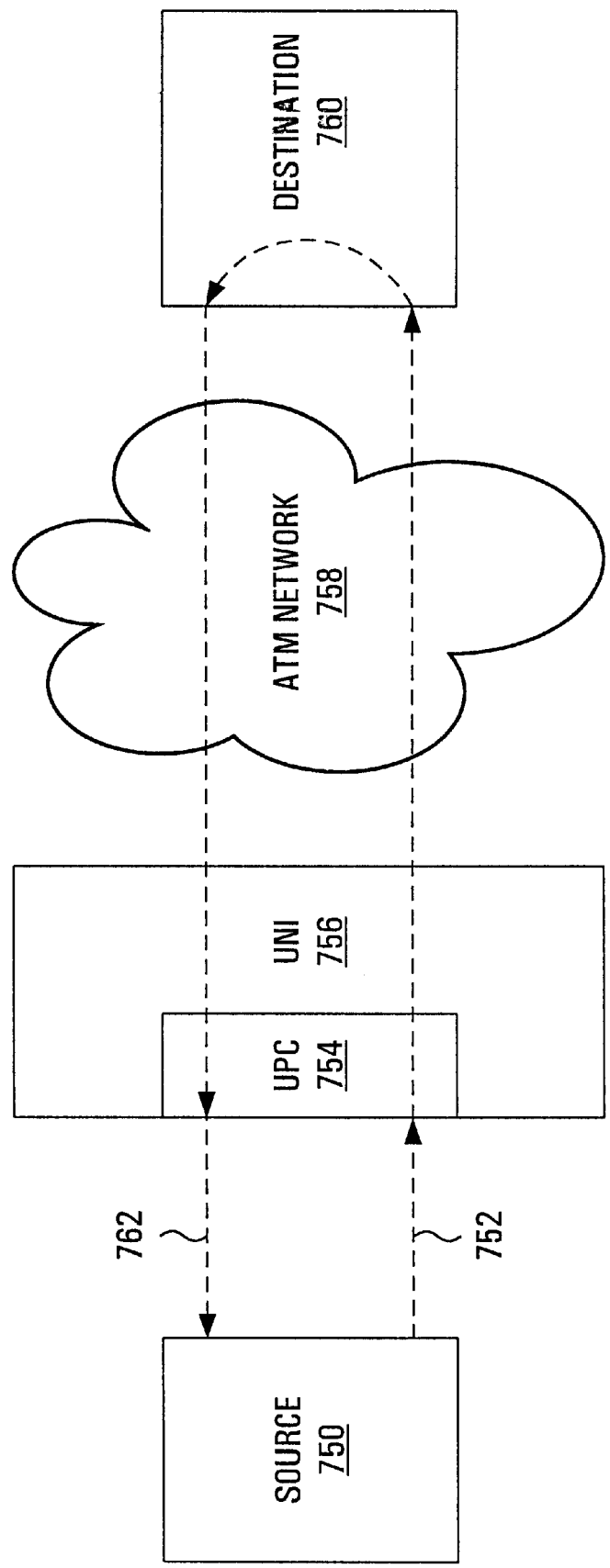
FIG. 1a is a diagram of a typical layout of network elements in an ATM system.

FIG. 1a illustrates the interaction between a source and an ATM network. A source 750 transmits an ATM cell along a forward link 752 to a User Network Interface (UNI) 756. A UPC 754 located on the UNI 756 checks the cell for conformance with a current policed rate. If the cell conforms with the current policed rate it continues into the ATM network 758 and eventually reaches its destination 760. If the cell was an F-RM cell the destination 760 sends it back towards the source 750 in the form of a B-RM cell. When the B-RM cell reaches the UNI 756 the UPC 754 takes note of the new Explicit Rate (ER) contained in the ER field of the cell. The UPC 754 delays enforcement of the new ER by a response delay. The response delay accounts for the time necessary for the B-RM cell to continue along the backward link 762 to the source, the time necessary for the source to process the new ER contained in the B-RM cell and to compute a new ACR, and the time necessary for the first data cell transmitted at the new ACR to reach the UPC 754 along the forward link 752. The UPC 754 also takes note of the Congestion Indication (CI) and No Increase (NI) values set in the B-RM cell.

Figure 1B:
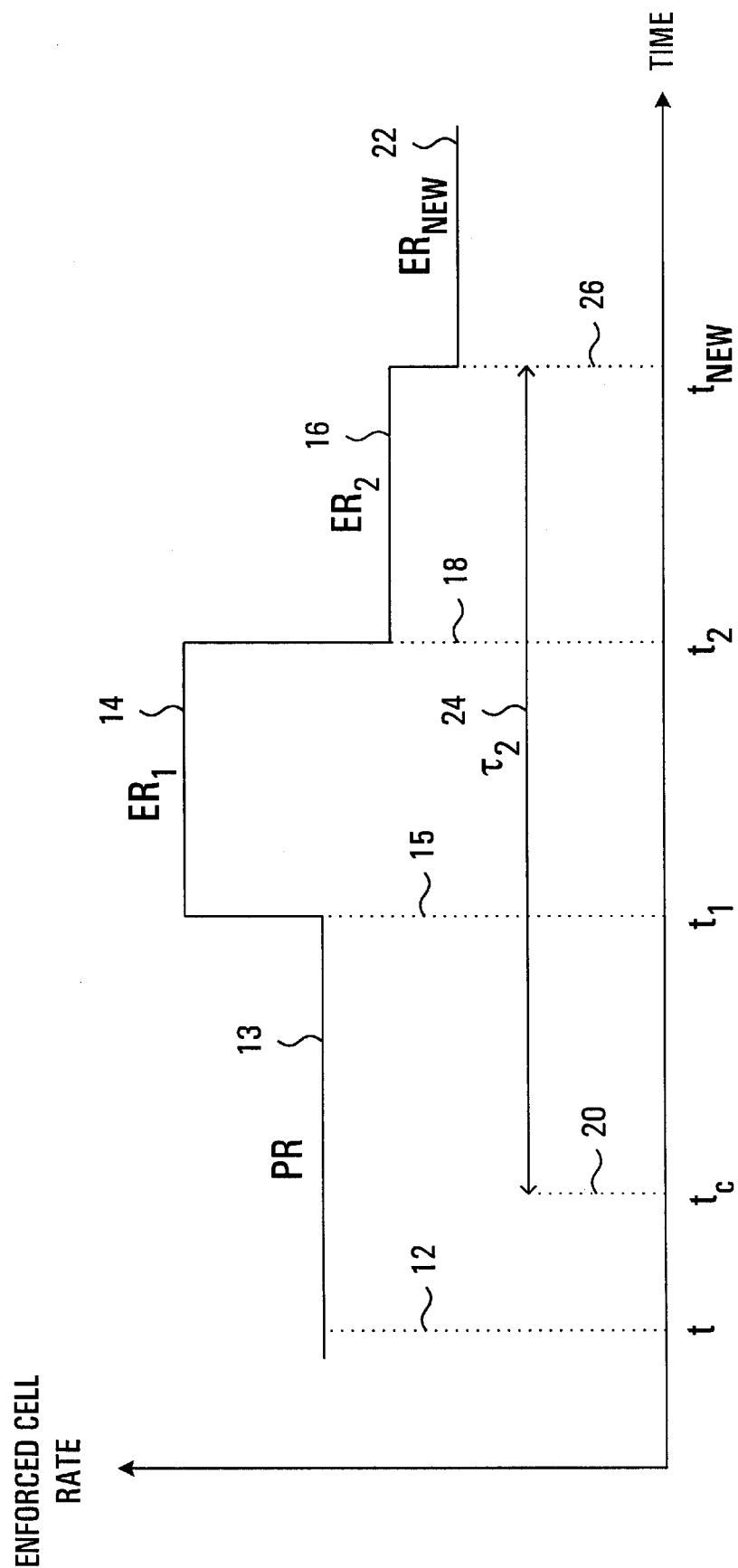
FIG. 1b is a diagram of a timing scenario in ER enforcement upon arrival of a new ER.
Figure 1C:
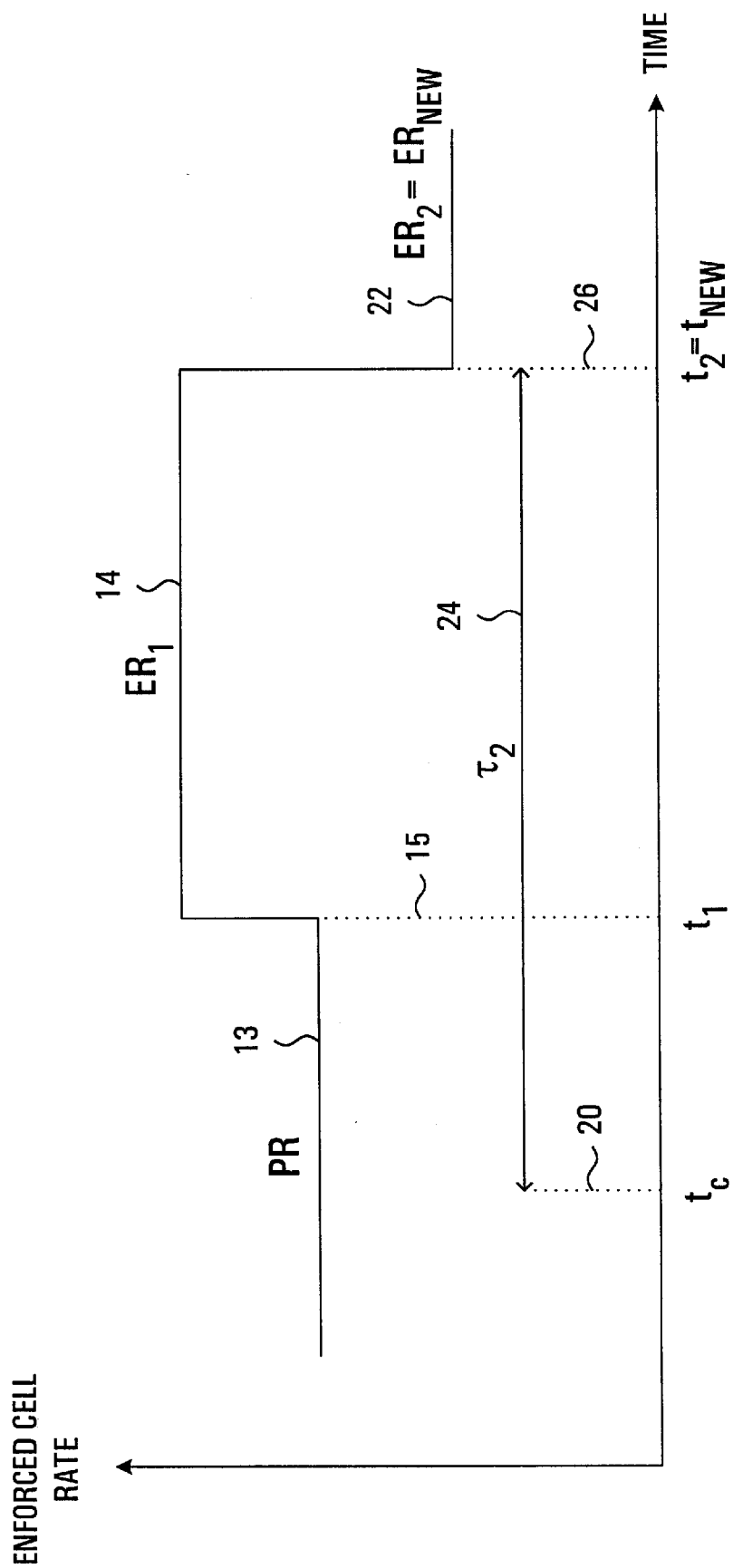
FIG. 1c is a diagram of the timing after an approximation has been carried out on the scenario illustrated in FIG. 1b.

FIG. 1b illustrates the scheduling problem for a policer that stores only two pending ERs and their corresponding enforcement times. At some time t 12 the UPC is enforcing a cell rate at a current Policed Rate (PR) 13. In the recent past, a B-RM cell has arrived with an ER of $ER_1$ and the UPC has scheduled enforcement of $ER_1$ 14 to begin at time $t_1$ 15. Soon thereafter, a second B-RM cell had arrived with an ER of $ER_2$ and the UPC scheduled enforcement of $ER_2$ 16 to begin at time $t_2$ 18. The UPC is at this point storing two pending ERs and their corresponding enforcement times. At some later time $t_c$ 20 a new B-RM cell arrives with an ER of $ER_{NEW}$ 22. $ER_{NEW}$ 22 is a decrease from $ER_2$ 16, so the UPC schedules an enforcement time of $t_c+\tau_2$ 24, at $t_{NEW}$ 26. Since enforcement of $ER_1$ 14 and $ER_2$ 16 are still pending, and the UPC can only store two ERS and their corresponding enforcement times, one of the three pending ERs must be discarded. Intuitively, removing $ER_1$ 14 and replacing it with PR 13 or $ER_2$ 16 can never be an option because over-policing would result and conforming user traffic sent at a rate higher than the two rates over the region between $t_1$ 15 and $t_2$ 18 would be cut off. The only option available without risking over-policing is to remove $ER_2$ 16 by extending $ER_1$ 14 to cover the time interval between $t_2$ 18 and $t_{NEW}$ 26. $ER_2$ 16 and $t_2$ 18 would be discarded from memory, and $ER_{NEW}$ 22 and $t_{NEW}$ 26 would take their place in memory. FIG. 1c illustrates the pending ERs and their enforcement times after the above approximation has been performed. The value of the ER in the second memory location is now $ER_{NEW}$ 22 and the value of the enforcement time in the second memory location is now $t_{NEW}$ 26. The effect has been to extend policing at $ER_1$ 14 until time $t_{NEW}$ 26.

Figure 2:
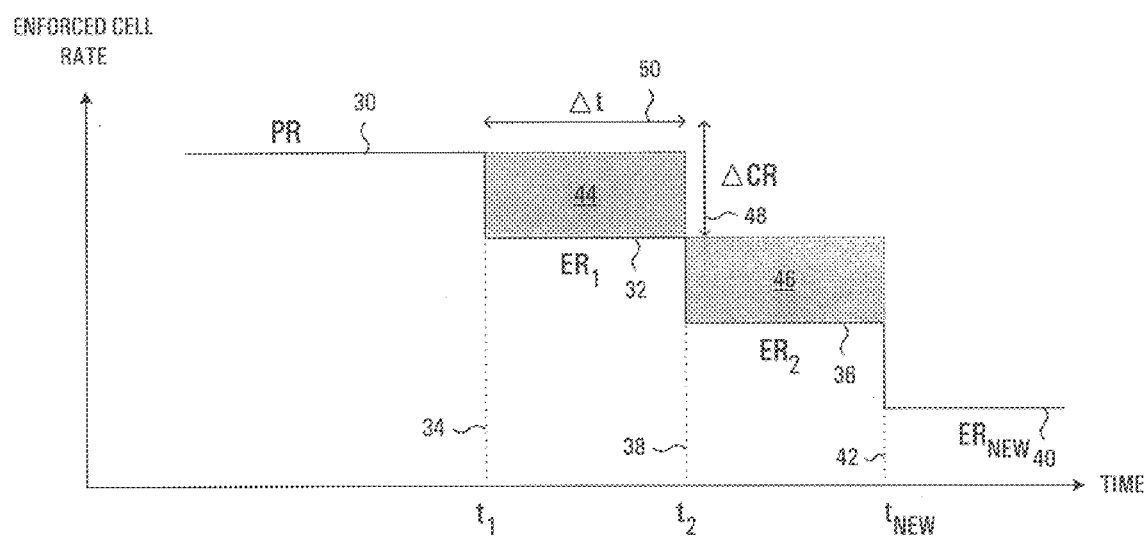
FIG. 2 is a diagram of the approximation options for ER enforcement for a particular combination of relative rates to be enforced.

The example of FIG. 1b is only one example of the permutations of relative ERs, and the required approximation is easily deduced. FIG. 2 illustrates another permutation, in which $PR>ER_1>ER_2>ER_{NEW}$. The UPC is currently policing at PR 30. It has scheduled enforcement of $ER_1$ 32 to begin at $t_1$ 34, and enforcement of $ER_2$ 36 to begin at $t_2$ 38. A new B-RM cell arrives carrying an ER value of $ER_{NEW}$ 40 and for which the UPC would normally schedule enforcement to begin at $t_{NEW}$ 42. However to store this new information it must discard one of the two ERs and its enforcement time from memory. In this permutation, there are two possible approximations. $ER_1$ could be discarded, in which case enforcement of PR 30 would extend to $t_2$ 38, resulting in a cheating room labelled as 44. Alternatively $ER_2$ could be discarded, in which case enforcement of $ER_1$ 32 would extend to $t_{NEW}$ 42, resulting in a cheating room labelled as 46. ($ER_{NEW}$ 40 should never be discarded, as it is not known for how long $ER_{NEW}$ 40 would normally have to be enforced, and the approximation could carry on indefinitely.) Ideally, the UPC would compare the size of the cheating room in each alternative, and select the approximation that results in the lower cheating room. For cheating room 44 the number of possible excess cells would be found by multiplying the time over which the approximation is made, $\Delta t$ 50, by the excess cell rate which would not be noticed, $\Delta CR$ 48. However, multiplications are far more expensive to implement than simple comparison operations, and for permutations with more than one possible approximation it is preferable to simply select one approximation based on some other criterion that can be represented in terms of simple comparison operations.

Figure 3:
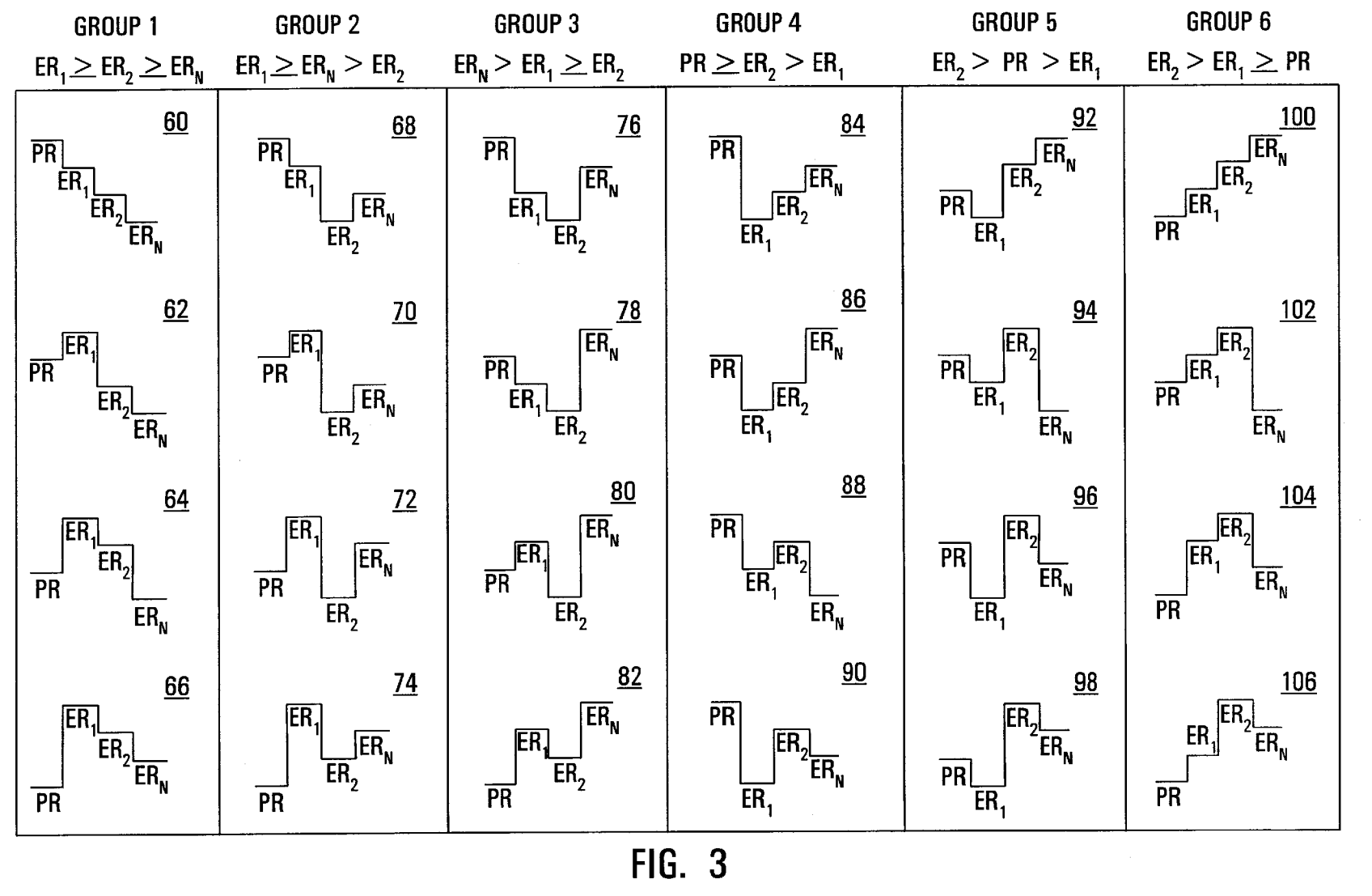

In a policer which stores the values of two pending ERs and their associated enforcement times, there are 24 possible permutations of relative cell rates for PR, $ER_1$, $ER_2$ and $ER_{NEW}$. These twenty-four permutations are illustrated in FIG. 3, organized into six groups according to criteria depicted at the top of each column. This grouping has been chosen specifically to illustrate the method of this invention. $ER_N$ has been used to denote the new ER in FIG. 3 rather than $ER_{NEW}$ in order to avoid cluttering the diagram. $ER_N$ has also been used in FIGS. 6, 7 and 10.

Figure 4:
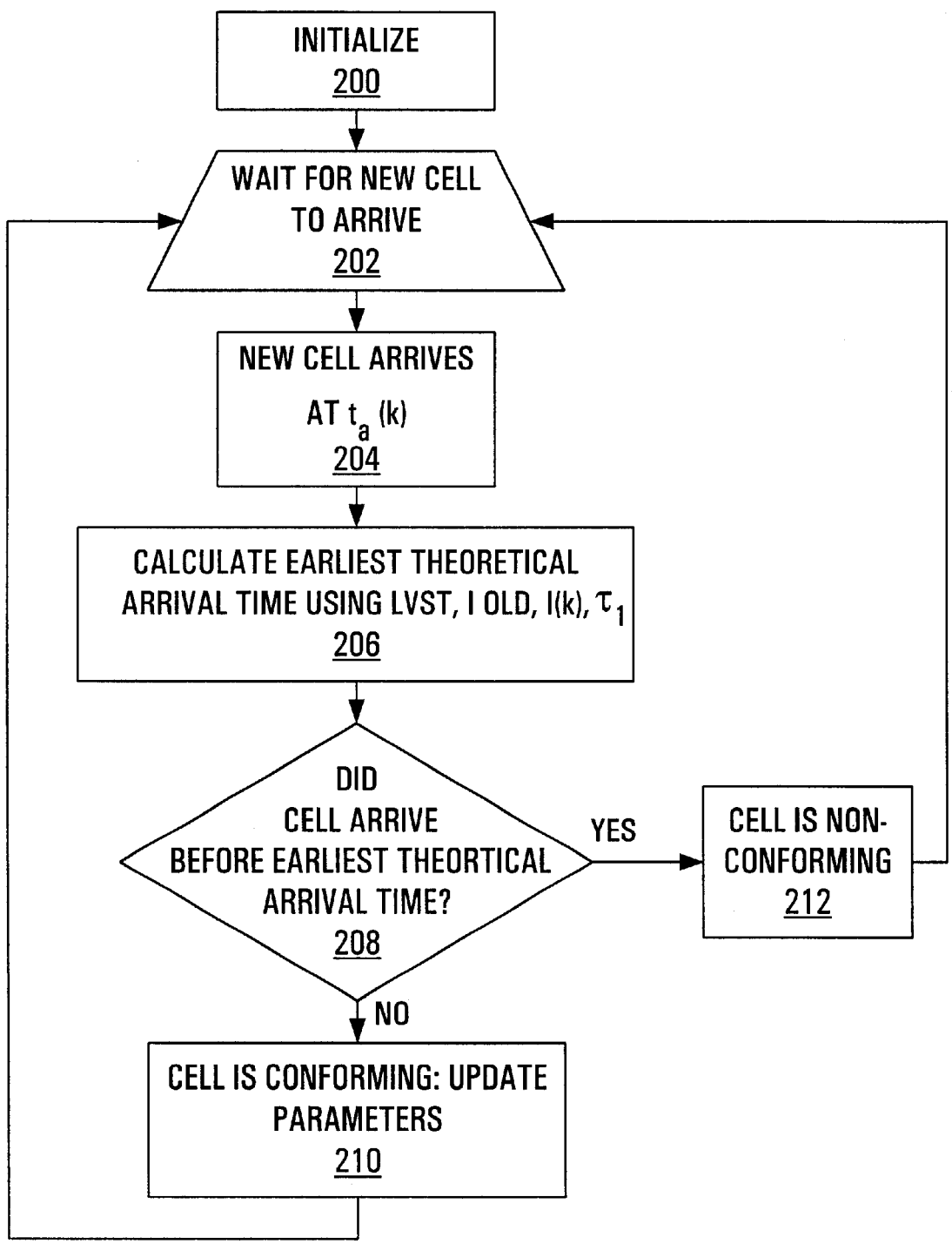
FIG. 4 is a flowchart of cell conformance testing for a DGCRA.

The ATM Forum describes an example that generalizes the major steps to carry out ABR policing given that the dynamic policed rate and its scheduled enforcement time are properly developed. The generalization is achieved by substituting a constant cell interval (i.e. cell time increment)

with a varying cell interval. The flow chart of FIG. 4 shows the suggested routine to be followed by DGCRAs in testing cell conformance. The more specific DGCRAs differ in how the expected time increment for a particular cell, I(k), is calculated. More precisely, I(k)=1/PR and the DGCRAs differ in which ER is assigned to PR. In the general algorithm two parameters, LVST (the Last Virtual Scheduling Time) and Iold (the increment between cell arrival times when the last cell arrived) are initialized at 200. The algorithm then waits for a new cell to arrive at 202. When a new $k^{th}$ cell arrives at time $t_a(k)$ 204, the algorithm calculates an earliest Theoretical Arrival Time (TAT) of the cell at 206 using the parameters LVST and $I_{old}$, a constant $\tau_1$ to allow tolerance for jitters and bursts, and the calculated value of the increment between cell arrivals for this cell, I(k). The earliest TAT is given by the expression $$TAT = LVST + \text{minimum}(I(k), I_{old}) - \tau_1$$

The algorithm compares the cell arrival time $t_a(k)$ with the TAT at 208, and if $t_a(k) \leq TAT$ then the cell is conforming. The parameters LVST and Iold are updated at 210, with $$LVST = \text{maximum}(t_a(k), LVST + \text{minimum}(I(k), I_{old}))$$

$$I_{old} = I(k)$$

If at 208 $t_a(k) < TAT$, then the cell has arrived too early and the cell is nonconforming 212. The parameters LVST and Iold are not updated. In either case, the algorithm then returns to 202 to await the next cell.

In a system in which the policed ER is constant, the value of I(k) will be constant and the algorithm becomes the standard GCRA. However in ABR transmissions the value will vary with time as the ER offered to the source varies. The value of I(k) will initially be 1/ICR and will thereafter be 1/PR at any given time, varying between the minimum and maximum possible increments given by 1/PCR and 1/MCR respectively. The ATM Forum provides two methods for calculating the value of I(k). These are denoted as Algorithm A and Algorithm B. As described above Algorithm A assumes that an unlimited number of pending ERs be stored. This is impractical. Algorithm B requires the storage of only two pending ERs and their enforcement times, and is shown broadly in FIG. 5a. The policing system is initialized at 300, and the initial values of various parameters are set. Among these are a current policing rate PR, a first stored Explicit Rate $ER_1$, and a second stored Explicit Rate $ER_2$, all of which are set to the value of ICR. The two stored enforcement times, $t_1$ and $t_2$, are set to 0. The system then awaits a triggering event at 302. There are three triggering events. A B-RM cell can arrive at time $t_b(j)$ 304. A forward cell, either an F-RM cell or a data cell, can arrive at time ta(k) 312. Finally, the real time t can reach the first stored enforcement time $t_1$ 308.

This invention relates mainly to the events following triggering event 304. Accordingly the other events in FIG. 5a will only be dealt with broadly. The details are available in Informative Appendix III of the ATM Forum Technical Committee Traffic Management Specification Version 4.0. When the real time t reaches the first stored enforcement time $t_1$ at 308, the policed rate is set to the value of the first stored ER at 310. The stored values of $ER_1$ and $t_1$ are then replaced with the stored values of $ER_2$ and $t_2$, thereby setting the next pending ER to be the ER that had been stored as the second pending ER. The algorithm then returns to its waiting state at 302. When a F-RM cell arrives at 314 the algorithm checks to see if the time since the last F-RM cell arrived is greater than the ADTF at 316. If so, and PR is greater than the ICR, then PR is dropped to the ICR at 318. The F-RM cell is then checked for conformance at 320 using the arrival time of the cell, $t_a(k)$. This is done as set out in steps 204, 206, 208, 210, and 212 of FIG. 4, using the reciprocal of the current policed rate PR as the increment I(k). When a data cell arrives at 312 and 314, it is also checked for conformance at 320.

If a B-RM cell arrives at 304, the stored ERs are updated at 306. Step 306 is expanded in FIG. 5b. The algorithm first ensures that the new allowed cell rate $ER_{NEW}$ is within the bounds defined by $MCR \leq ER_{NEW} \leq PCR$ at 350. The algorithm then compares $ER_{NEW}$ with the first ER stored in memory, $ER_1$, at 352. If on the one hand $ER_{NEW} \geq ER_1$ then $ER_1$ is set to $ER_{NEW}$ at 354. The second stored ER is unscheduled by setting $t_2=0$ at 356. If there is currently no scheduled $t_1$ (358), then the new ER is scheduled by simply setting $t_1=t_b(j)+\tau_3$ at 360. If the comparison at 358 revealed that there is a currently scheduled $t_1$, then a further comparison is made between $ER_{NEW}$ and the current policed rate PR at 362. If $ER_{NEW}$ is an increase over PR, then the enforcement of the new ER is scheduled at 364 by setting $t_1$ as the earlier of the currently scheduled $t_1$ and the current time plus the response delay, $t_b(j)+\tau_3$. The earlier time is chosen in order to account for a possible time sequence anomaly. If on the other hand the new allowed cell rate $ER_{NEW}$ is a decrease from the first stored ER, checked at 366, then the first stored ER is left alone and the new ER overwrites the second stored ER at 368, using an enforcement time of $t_b(j)+\tau_2$. If enforcement of the first stored ER has already begun, checked at 370, then the values of $ER_1$ and $t_1$ are overwritten at 372 with the values stored as $ER_2$ and $t_2$. The algorithm ends at step 374, whereupon the flow returns to step 307 in FIG. 5a. At step 307 the algorithm tests for the eligibility of a potential time-out event. If the maximum time required for the ER carried by the B-RM cell to reach the source and for the effects to then be seen at the UPC is less than the time until the next ADTF time-out, then a binary ICR eligibility flag is set. This flag is used at step 316.

Figure 6:
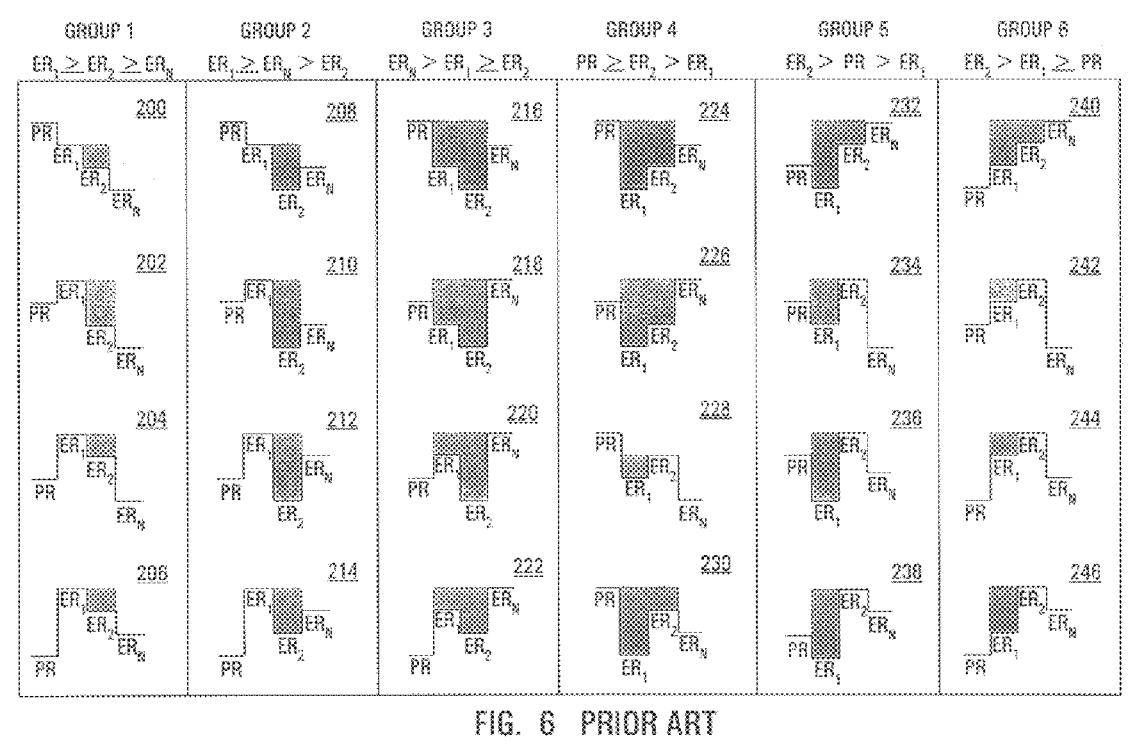

The effect of Algorithm B is illustrated in FIG. 6 as it is applied to each of the twenty-four permutations of relative rates. The shaded region in each diagram of FIG. 6 indicates the amount of cheating room made available by the approximation of Algorithm B. The amount of cheating room is quite high, particularly in groups 3, 4 and 5.

Figure 5A:
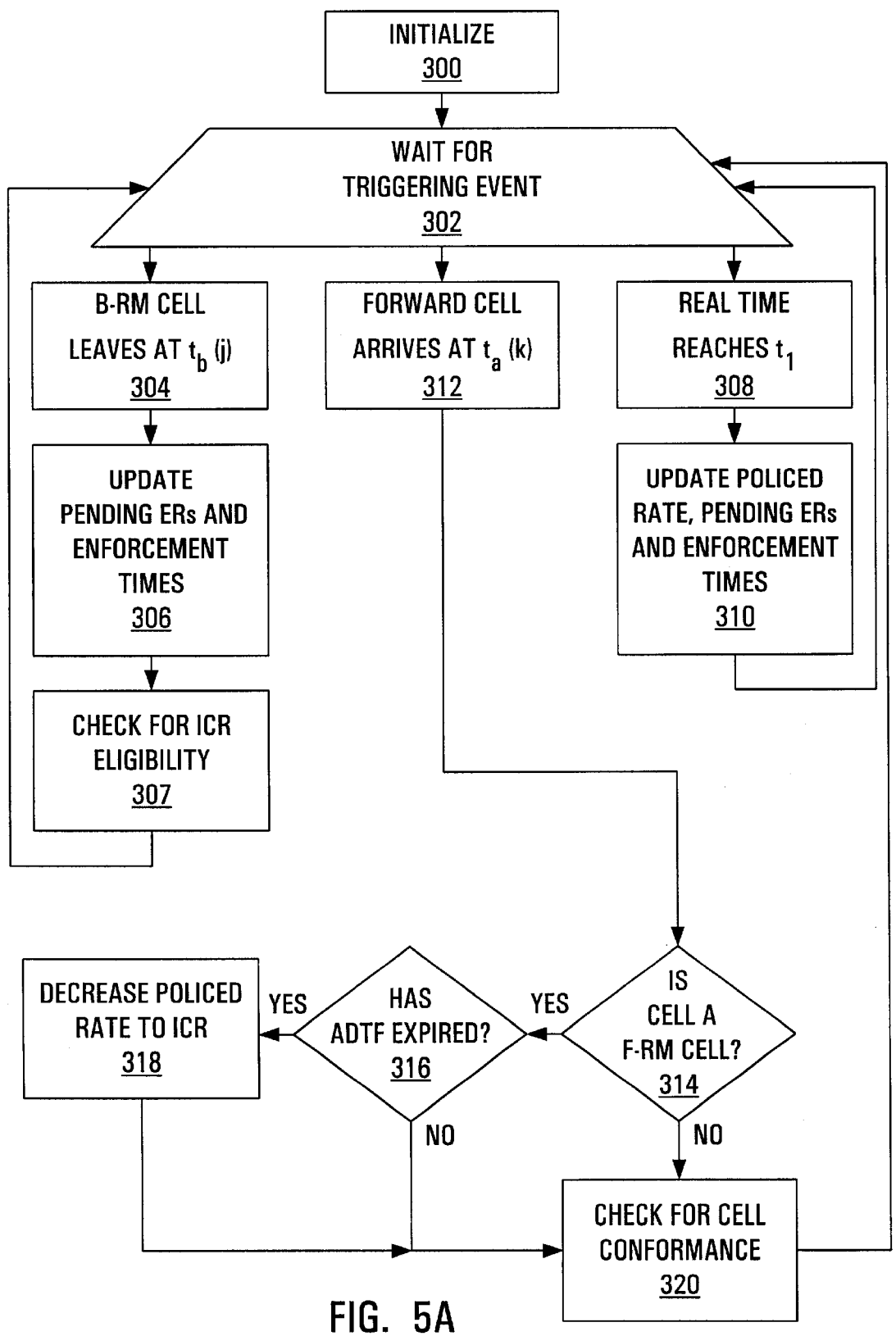
FIG. 5a is a flowchart of the DGCRA specified as Algorithm B.
Figure 5B:
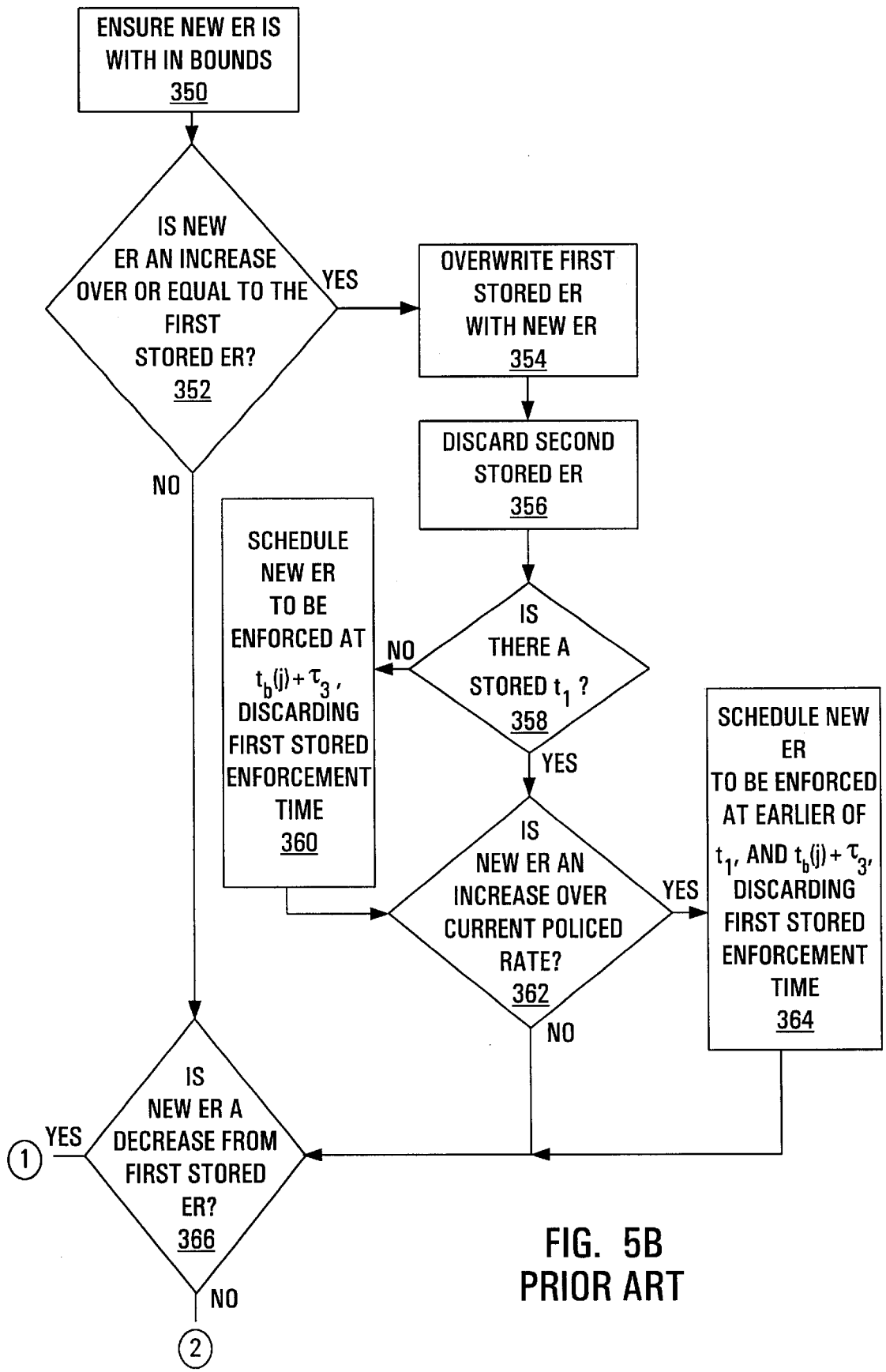
Figure 5B:
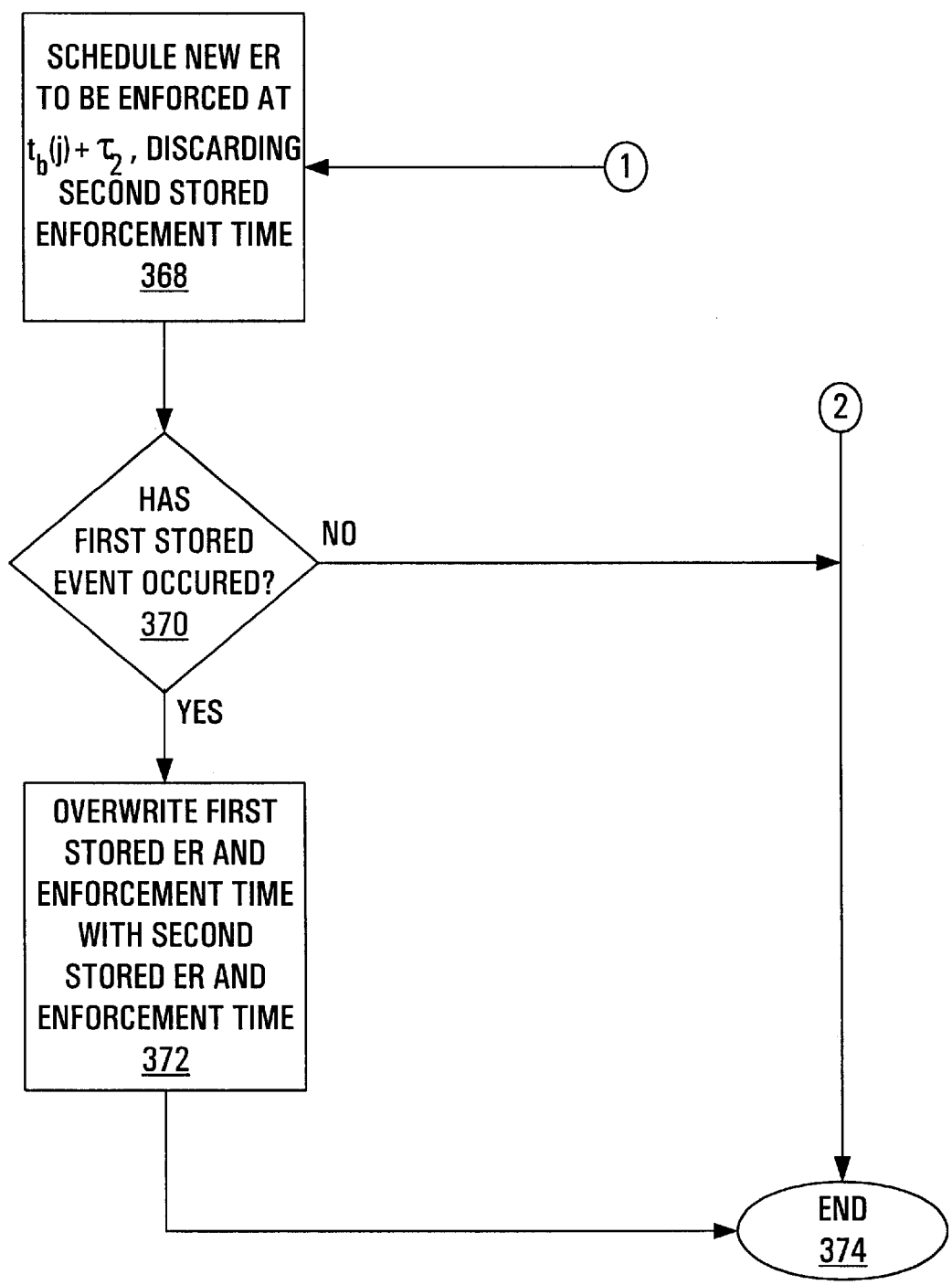
Figure 7:
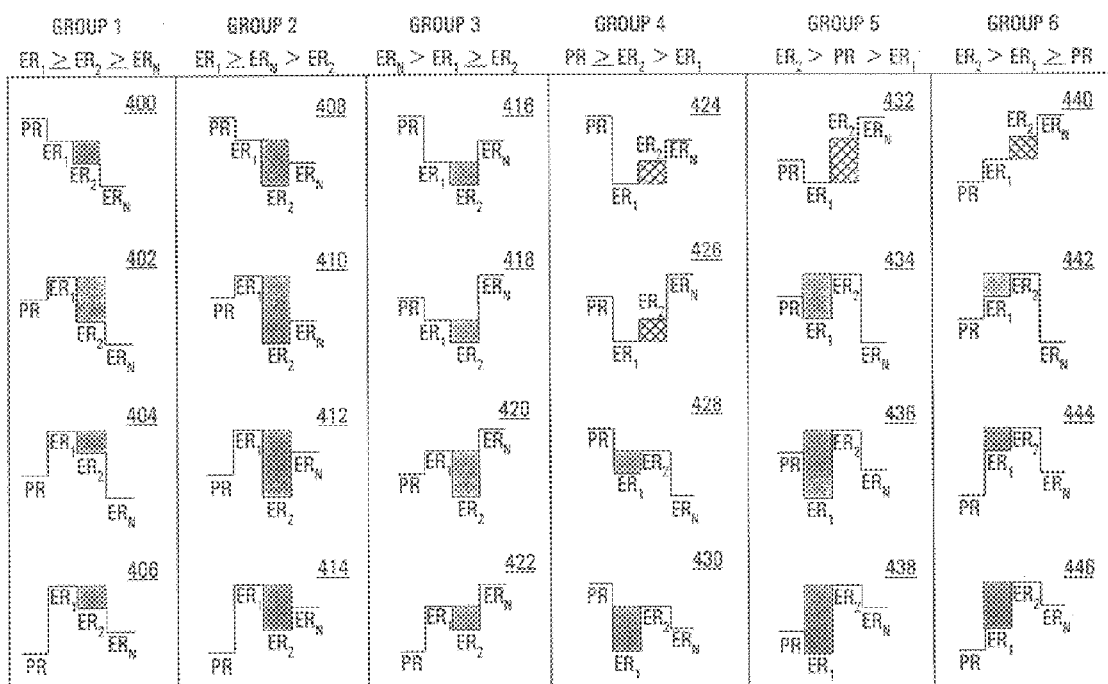
FIG. 7 is a diagram of the effect of Improved Algorithm B for every permutation of relative rates to be enforced.

Improved Algorithm B, which uses a different method to update the pending ERs and their enforcement times at step 306 of FIG. 5a, results in less cheating room but overpolicing occurs in some permutations of relative rates. The effect of Improved Algorithm B is illustrated in FIG. 7 as it is applied to each of the twenty-four permutations of relative rates. The shaded region in each diagram of FIG. 7 indicates the amount of cheating room made available by Improved Algorithm B, while the hatched regions indicate the amount of over-policing which occurs as a result of Improved Algorithm B. A comparison of FIG. 7 with FIG. 6 shows that in every permutation, Improved Algorithm B allows less cheating room or the same cheating room than Algorithm B. However in four of the permutations, 424, 426, 432, and 440, Improved Algorithm B over-polices the cell rate. Honest sources transmitting at a cell rate within the allowed cell rate of $ER_2$ but above $ER_1$ will have some of their cells discarded.

Figure 8:
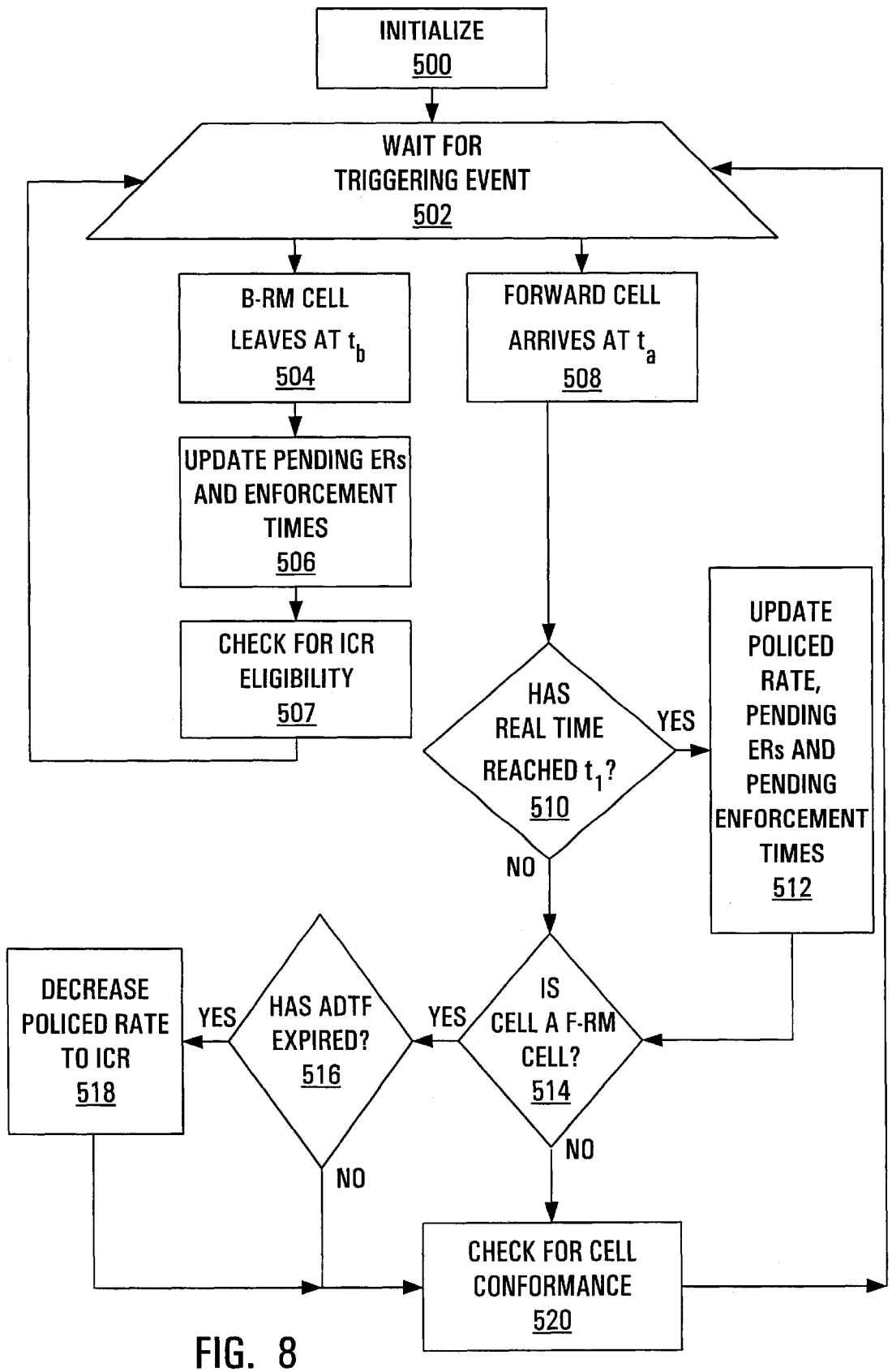
FIG. 8 is a flowchart of the DGCRA of the invention.

This invention provides a superior method of carrying out the approximations required of a UPC that stores only two pending ERs and their enforcement times. The high level method is shown in FIG. 8, and is similar to that shown in FIG. 5a except that triggering event 308 has been merged into triggering event 312 in a way which does not affect the logic of the high level method. The thrust of this invention is the updating of the pending ERs and their enforcement times, which occurs at step 506. Steps other than 506 are similar to those in FIG. 5a. Step 506 is expanded in FIG. 9a. In describing FIG. 9a, reference will be made to FIG. 10 which illustrates the effect of this method as it is applied to each of the twenty-four permutations of relative rates. The shaded region in each diagram of FIG. 10 indicates the amount of cheating room made available by this method.

Returning to FIG. 9a, the algorithm ensures at step 600 that the ER contained in the newly arrived B-RM cell is within the bounds permitted by MCR and PCR and accounts for any binary-oriented relative rate changes. The network may contain no binary switches, but the preferred embodiment monitors for binary-oriented relative rate changes in case the network does contain binary switches. Step 600 is expanded in FIG. 9b. If congestion is indicated at 650 by the CI field of the B-RM cell, then a binary switch somewhere along the path from the source to the destination has indicated congestion. The new ER is set at 652 to the lower of the ER contained in the B-RM cell and a fraction 1-RDF of the second stored ER, $ER_2$, where RDF is the Rate Decrease Factor negotiated at call set-up. If no congestion is indicated at 650, the NI field of the B-RM cell is checked at step 654. If the NI field does not indicate No Increase, then no binary switch along the path has indicated not to increase the ER. However the cell rate may still be constrained by an ER setting network element, so the new ER is set at 656 to the lower of the ER contained in the B-RM cell and a fixed increase of RIF*PCR over the second stored ER, $ER_2$, where RIF is the Rate Increase Factor negotiated at call set-up. If the NI field at 654 indicates No Increase, then the new ER is given the value contained in the B-RM cell. Finally, In all cases, the new ER is constrained to lie between MCR and PCR at 658. If the new ER is less than MCR then it is given a value of MCR. If the new ER is greater than PCR it is given a value of PCR. The new ER determination ends at 660, where the flow returns to step 602 of FIG. 9a.

Figure 9A:
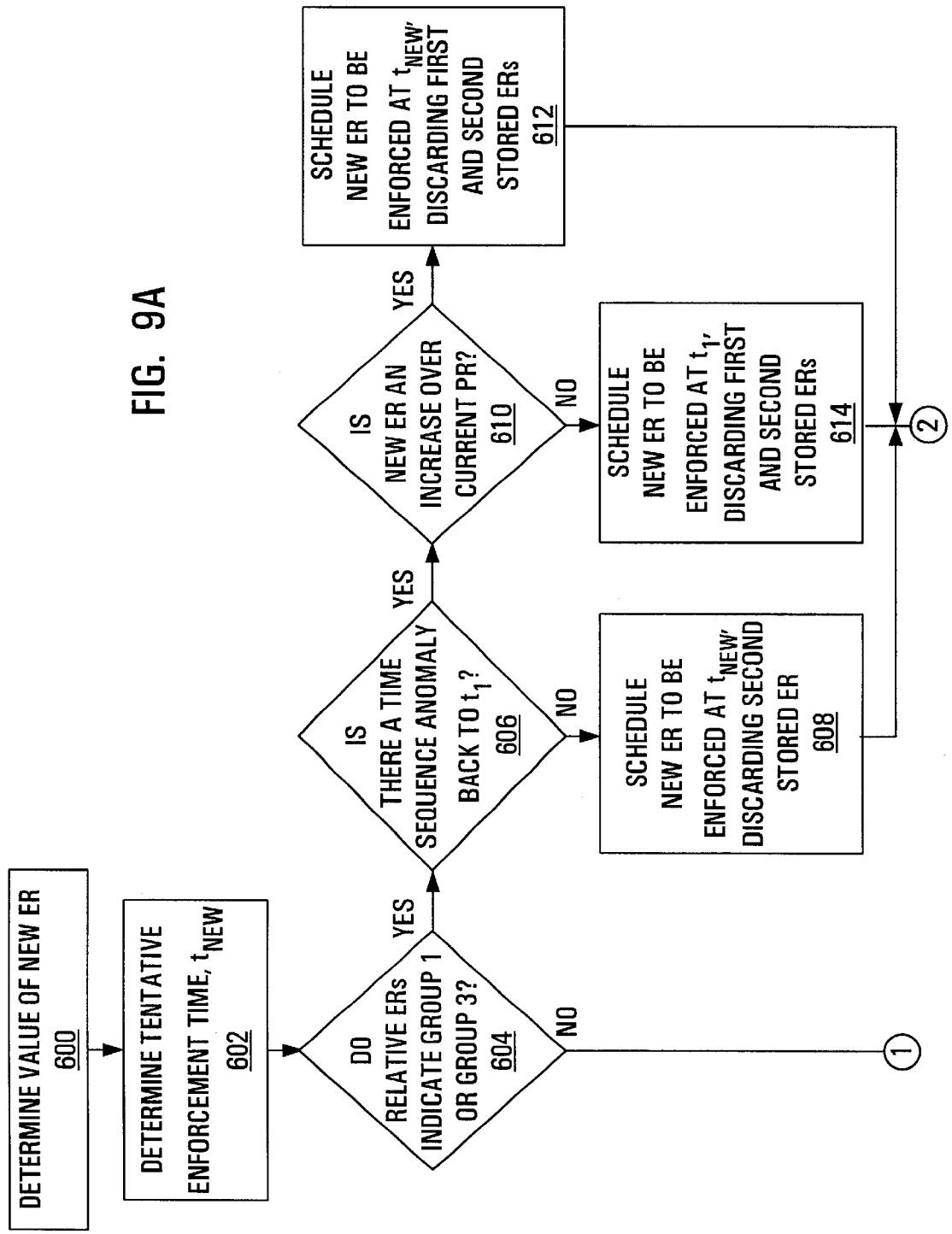
FIG. 9a is a detailed flowchart of one step of the flowchart of FIG. 8.
Figure 9A:
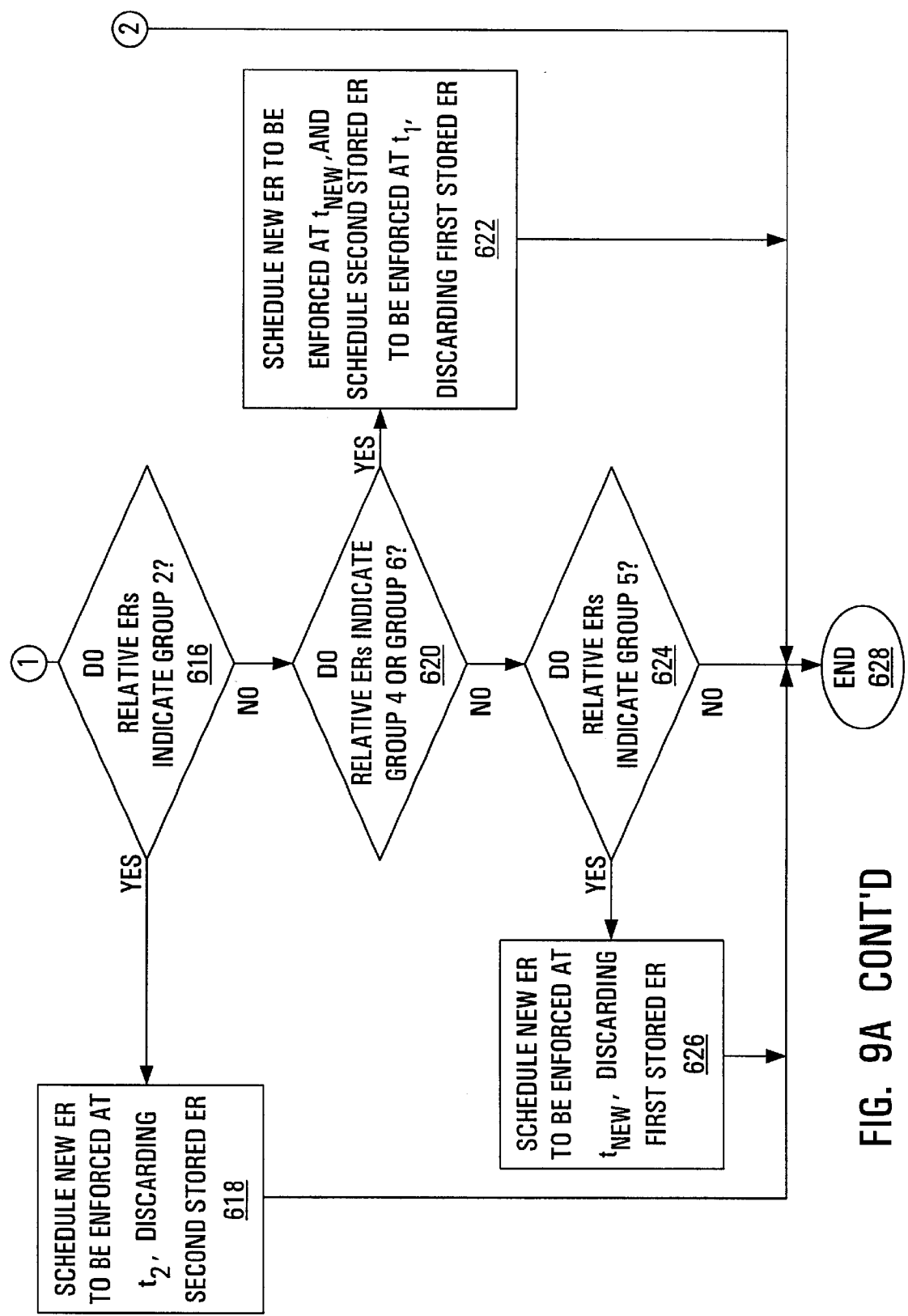
Figure 9B:
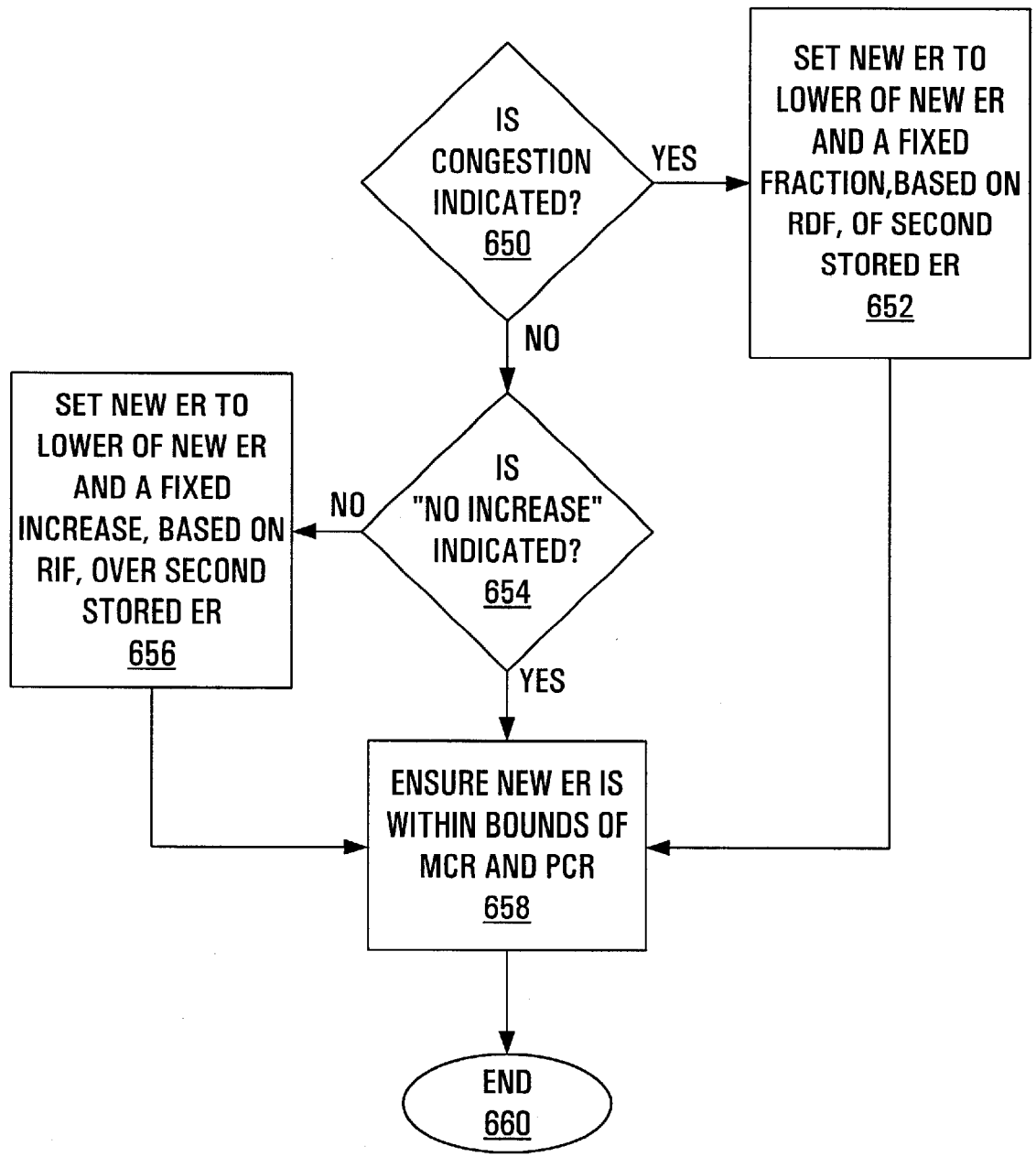

At step 602 of FIG. 9a, a tentative enforcement time, $t_{NEW}$, for the new ER, $ER_{NEW}$, is determined at step 602. If $ER_{NEW}$ is an increase over (or equal to) the second stored ER, $ER_2$, then the shortest response delay is assumed and $t_{NEW}$ is set to $t_b+\tau_3$. If $ER_{NEW}$ is a decrease from $ER_2$ then $t_{NEW}$ is set to $t_b+\tau_2$. The algorithm then determines which of the six groups shown in FIG. 3 contains the permutation that matches the relative cell rates of PR, $ER_1$, $ER_2$ and $ER_{NEW}$. This is determined using the criteria shown at the top of the columns in FIG. 3. If the current relative rates are found to belong to Group 1 or Group 3 at step 604, then at least one first additional Step is carried out to adjust the values of the stored ERs and the stored enforcement times. Preferably, the algorithm checks for a time sequence anomaly at step 606. A time sequence anomaly will occur if $ER_{NEW}$ has been tentatively scheduled to be enforced before $ER_1$ will be put into effect, in other words if $t_{NEW}<t_1$. This may happen when $ER_{NEW}$ represents a rate increase over $ER_2$ which in turn represents a rate decrease from $ER_1$, as in the permutations of Group 3. The algorithm need not check for a time sequence anomaly as far back as only $t_2$, because the update operations for this type of time sequence anomaly ($t_1<t_{NEW}<t_2$) are identical to the update operations (described below) carried out by the invention when there is no time sequence anomaly. If a time sequence anomaly ($t_{NEW}<t_1$) is indicated, then the new ER is compared with the current policed rate at step 610. If $ER_{NEW}>PR$, then the new ER is scheduled to be enforced at the tentatively scheduled enforcement time, and the first and second stored ERs and their enforcement times are discarded at step 612, If the comparison at 610 indicates that $ER_{NEW}$ is not an increase over PR, then the new ER is scheduled to be enforced at the time that $ER_1$ had been scheduled to be enforced, $t_1$, and the first and second stored ERs and their enforcement time are discarded at step 614. If no time sequence anomaly is indicated at 606, then the new ER is scheduled to be enforced at the tentatively scheduled enforcement time, and the second stored ER is discarded at 608. The effect of the approximation of 608 is to extend enforcement of $ER_1$ to $t_{NEW}$, as shown in 700, 702, 704, 706, 716, 718, 720, and 722 of FIG. 10.

If the relative rates are found to belong to Group 2 at step 616, then at least one second additional step is carried out to adjust the values of the stored ERs and the stored enforcement times. Preferably, the new ER is scheduled to be enforced at the time currently scheduled for enforcement of the second stored ER, narmely $t_2$, and the second stored ER is discarded at step 618. For the permutations in Group 2, there may be a time sequence anomaly. However, because $ER_1$ is greater than $ER_{NEW}$, the update operations necessary for dealing with a time sequence anomaly are identical to the update operations which would be carried out absent a time sequence anomaly, and the time sequence anomaly can be omitted for implementation simplicity. The effect of the approximation at 618 is to begin enforcement of $ER_{NEW}$ when $ER_2$ would otherwise have been enforced, as shown in 708, 710, 712, and 714 of FIG. 10.

If the relative rates are found to belong to Group 4 or Group 6 at step 620, then at least one third additional step is carried out to adjust the values of the stored ERs and the stored enforcement times. Preferably, the new ER is scheduled to be enforced at the tentatively scheduled time tNEw, and the second stored ER is scheduled to be enforced at the time currently scheduled for enforcement of the first stored ER, namely $t_1$, at 622. The first stored ER Is discarded. Because the relative rates in all the permutations of Group 4 and Group 6 do not satisfy the pre-conditions (described above) for a potential time sequence anomaly, the time sequence anomaly check is unnecessary. The effect of the approximation at 622 is to begin enforcement of $ER_2$ when ER would otherwise have been enforced, as shown in 724, 126, 728, 730, 740, 742, 744, and 746 of FIG. 10.

If the relative rates are found to belong to Group 5 at step 624, then at least one fourth additional step is carried out to adjust the values of the stored ERs and the stored enforcement times. Preferably, the new ER is scheduled to be enforced at the tentatively scheduled time $t_{NEW}$, and the first stored ER is discarded at step 626. Note that because the 24 permutations and six groups of FIG. 3 are exhaustive, the comparison of relative rates at step 624 should always be true since the comparisons at steps 604, 616, and 620 must have been false for the algorithm to have reached step 624. Because the relative rates in all the permutations of Group 5 do not satisfy the pre-conditions (described above) for a potential time sequence anomaly, the time sequence anomaly check is unnecessary. The effect of the approximation at 626 is to extend enforcement of the current policed rate PR until $t_2$, as shown in 732, 734, 736, and 738 of FIG. 10.

The updating of the pending ERs and their enforcement times is completed at 628, whereupon the flow returns to step 507 in FIG. 8. At step 507 the algorithm tests for the eligibility of a potential time-out event, as in step 307 in FIG. 5a.

Figure 10:
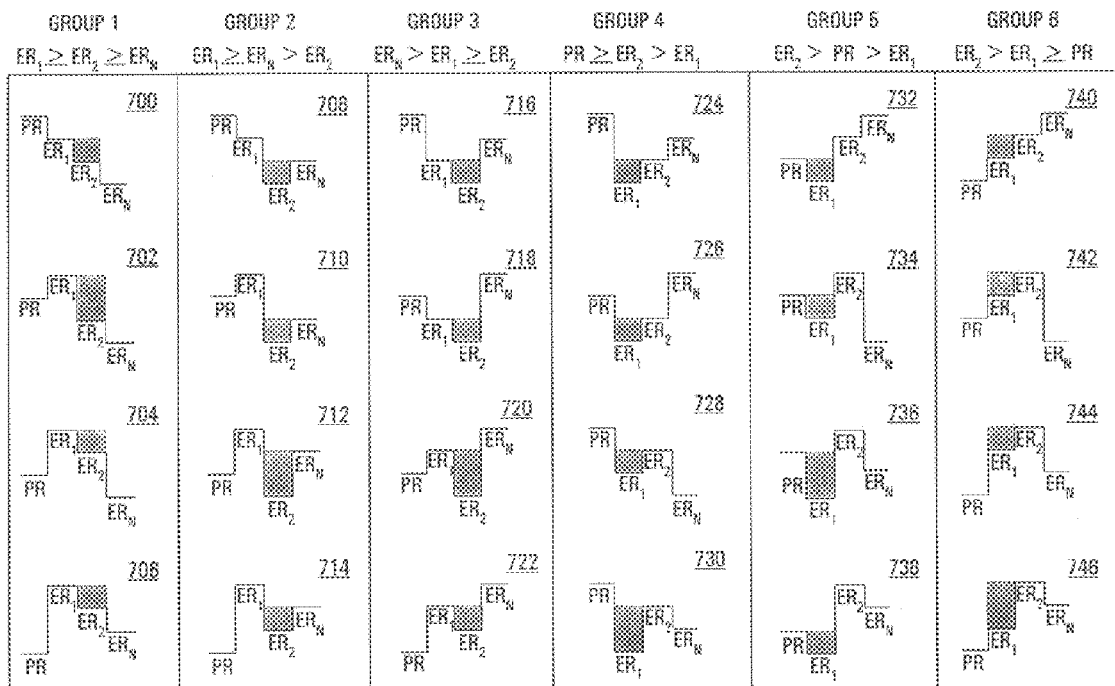
FIG. 10 is a diagram of the effect of the algorithm of the invention for every permutation of relative rates to be enforced.

A comparison of FIG. 6, FIG. 7, and FIG. 10 illustrates the advantages of this invention. In almost every permutation of relative rates, the method of this invention allows the same or less cheating room than do Algorithm B and Improved Algorithm B. The exceptions are permutations 724, 726, 732, and 740 of FIG. 10. A comparison of these approximations with those of 424, 426, 432, and 440 of FIG. 7 respectively reveals that the approximation of this invention allows more cheating room than does Improved Algorithm B in these permutations. However Improved Algorithm B over-polices in these permutations and so the method of this invention is preferable even in these four instances. Overall, this invention provides more effective ABR traffic policing than the two ATM Forum examples.

Because of the high number of cells passing through the UPC and the speed with which the policing must be carried out, the invention is implemented on hardware. For example, the method can be carried out by a Programmable Logic Device or by an Integrated Circuit.

The precise definition of the six groups of permutations, shown in FIG. 3, are only one possible set of definitions. The definitions can vary slightly without departing from the scope of the invention. These variations occur when two adjacent rates are equal, in which case the permutation may belong in one of two groups. The group to which the permutation belongs will depend on the placement of the equality condition in the definition of the groups. The inequality conditions of the groups of the preferred embodiment uniquely define the six groups, but there is flexibility in how the equality conditions are used to define the groups. However, the equality conditions must be used in such a way that there is no overlap of the groups and the groups form a complete partition of all the possible permutations. In other words, the equality conditions must be defined in such a way that every permutation, including any permutation in which some of the rates are equal, belongs to one of the six groups and only one of the six groups.

The preferred embodiment takes binary-oriented relative rate changes into account when determining the cell rate to enforce. The invention will function without this feature, but its advantage will be limited to reducing the cheating room through better selection of which pending ERs to store and which pending ERs to discard.

The feature of taking binary-oriented relative rate changes into account when determining the cell rate can also be used in conjunction with other DGCRAs such as Algorithm B and Improved Algorithm B. However the full advantage of the invention, including better selection of which pending ERs to store and which pending ERs to discard, will not be available in such a case.

The preferred embodiment stores two pending ERs and their enforcement times, in accordance with current industry practice. However the scope of the invention extends to situations in which more than two pending ERs are stored, and the invention can be modified to store more than two pending ERs. If n pending ERs are stored then there will be (n+2)! permutations of relative rate profiles of the rates PR, $ER_1$, . . . $ER_n$, and $ER_{NEW}$, if each rate is different. Permutations in which some rates are equal must be incorporated into these permutations and each such equal-rate permutation must be included in only one of the (n+2)! permutations. For each permutation the necessary approximation is determined ahead of time by locating the two adjacent stored pending ERs (including PR and $ER_{NEW}$) having the lowest difference. The difference between ERs is the number of rate levels separating the ERs. For implementation simplicity the ERs are assigned to rate levels based solely on the relative values of all the ERs in the permutation and the rate levels are viewed as separated by fixed amounts. For example, in the permutation 718 of FIG. 10, $ER_1$ and $ER_2$ are separated by one rate level, and $ER_2$ and $ER_{NEW}$ are separated by three rate levels. The lower of the two selected rates is eliminated by extending the higher rate over the low rate region and eliminating the enforcement time scheduled for the change between the two rates. The subsequent stored ERs are each moved forward in the queue, freeing up the final storage space for $ER_{NEW}$ and its enforcement time. The selection of which pending ERs to merge is restricted in that neither the PR nor $ER_{NEW}$ should be changed. Once the approximation for each permutation has been determined, the permutations are classified into groups according to similarities of profile identification and approximation operations. By grouping the permutations, the logic for identifying which approximation operation must be carried out upon receiving a new ER is simplified. If a permutation has more than one pair of adjacent ERs having the lowest difference, the pair is selected such that the total number of groups is minimized. For example, in permutation 700 of FIG. 10 the PR could be extended over the time scheduled for $ER_1$, since the difference between PR and $ER_1$ is equal to the difference between $ER_1$ and $ER_2$. However, by extending $ER_1$ over the time scheduled for $ER_2$ the permutation shares the same identification profile and approximation operations as permutations 702, 704, and 706, and a new group need not be defined. If there are still more than one alternative with the minimum difference after considering the groups to which the permutation would belong, any of the optimum pairs can be selected. The groups must be defined such that they are mutually exclusive and they form a complete partition of all the possible permutations, as in the case of only two stored pending ERs. For any permutation in which the new ER represents a rate increase over the last stored ER, which in turn represents a rate decrease from the second last stored ER, the invention should check for a time sequence anomaly. The operations for dealing with the time sequence anomaly are similar to those described above for the case of two stored pending ERs. However, for any permutation in which the update operations necessary for dealing with a time sequence anomaly are identical to the update operations which would be carried out absent a time sequence anomaly, the time sequence anomaly check can be omitted.

The preferred embodiment of the invention checks for expiry of $t_1$, in order to determine if enforcement of $ER_1$ should begin, only when a forward cell arrives at the policer. Alternatively the policer could monitor for expiry of $t_1$ continuously.

What has been described is merely illustrative of the application of the principles of the invention. Other arrangements and methods can be implemented by those skilled in the art without departing from the spirit and scope of the present invention.

We claim:

1. A method for policing the cell transmission rate of traffic from a variable cell transmission rate source in a cell relay communication system in which the source is informed of a new explicit cell transmission rate (ER) periodically and the communication system enforces the ER after a response delay, the method comprising the steps of:

ensuring that traffic from the source complies with a current policed cell transmission rate (PR), storing a first stored ER (ER1), storing a first stored enforcement time defined as the time at which enforcement of ER1 begins, storing a second stored ER (ER2), storing a second stored enforcement time defined as the time at which enforcement of ER2 begins, the second stored enforcement time being greater than or equal to the first stored enforcement time, monitoring for a new ER to be enforced, and upon detecting a new ER to be enforced, the further steps of:

determining a tentative enforcement time for the new ER, comparing the PR, the first stored ER (ER1), the second stored ER (ER2), and the new ER, if ER1 is greater than ER2 and if ER2 is greater than the new ER, or if the new ER is greater than ER1 and ER1 is greater than ER2, carrying out at least one first additional step to adjust the values of the stored ERs and the stored enforcement times, if ER1 is greater than the new ER and the new ER is greater than ER2, carrying out at least one second additional step to adjust the values of the stored ERs and the stored enforcement times, if the PR is greater than ER2 and ER2 is greater than ER1, or if ER2 is greater than ER1 and ER1 is greater than the PR, carrying out at least one third additional step to adjust the values of the stored ERs and the stored enforcements times, and if ER2 is greater than the PR and the PR is greater than ER1, carrying out at least one fourth additional step to adjust the values of the stored ERs and the stored enforcement times.

2. The method of claim 1 wherein the at least one first additional step comprises the steps of:

monitoring for a time sequence anomaly, if no time sequence anomaly is detected, replacing the second stored ER with the new ER and replacing the second stored enforcement time with the tentatively scheduled enforcement time, and if a time sequence anomaly is detected, the steps of:
comparing the new ER with the PR,
if the new ER is greater than the PR, replacing the first and second stored ERs with the new ER and replacing the first stored enforcement time with the tentatively scheduled enforcement time, and
if the new ER is not greater than the PR, replacing the first and second stored ERs with the new ER, the at least one second additional step comprises the step of:
replacing the second stored ER with the new ER, the at least one third additional step comprises the steps of:
replacing the first stored ER with the second stored ER,
replacing the second stored ER with the new ER, and replacing the second stored enforcement time with the tentatively scheduled enforcement time, and the at least one fourth additional step comprises the steps of:
replacing the first stored ER with the second stored ER,
replacing the first stored enforcement time with the second stored enforcement time, replacing the second stored ER with the new ER, and replacing the second stored enforcement time with the tentatively scheduled enforcement time.

3. The method of claim 1 wherein the cell relay communication system is an Asynchronous Transfer Mode communication system.

4. The method of claim 3 wherein the variable cell transmission rate source is transmitting cells in accordance with an Available Bit Rate service category.

5. The method of claim 2 wherein the cell relay communication system is an Asynchronous Transfer Mode communication system.

6. The method of claim 5 wherein the variable cell transmission rate source is transmitting cells in accordance with an Available Bit Rate service category.

7. A method for policing the cell transmission rate of traffic from a variable cell transmission rate source in a cell relay communication system in which the source is informed of a new explicit cell transmission rate (ER) periodically and the communication system enforces the ER after a response delay, the method comprising the steps of:

ensuring that traffic from the source complies with a current policed cell transmission rate (PR), storing a first stored ER (ER1), storing a first stored enforcement time defined as the time at which enforcement of ER1 begins, storing a second stored ER (ER2), storing a second stored enforcement time defined as the time at which enforcement of ER2 begins, the second stored enforcement time being greater than or equal to the first stored enforcement time, monitoring for a new ER to be enforced, and upon detecting a new ER to be enforced, the further steps of:

determining a tentative enforcement time for the new ER, comparing the PR, the first stored ER (ER1), the second stored ER (ER2), and the new ER, if ER1 is greater than or equal to ER2 and if ER2 is greater than or equal to the new ER, or if the new ER is greater than ER1 and ER1 is greater than or equal to ER2, carrying out at least one first additional step to adjust the values of the stored ERs and the stored enforcement times, if ER1 is greater than or equal to the new ER and the new ER is greater than or equal to ER2, carrying out at least one second additional step to adjust the values of the stored ERs and the stored enforcement times, if the PR is greater than or equal to ER2 and ER2 is greater than ER1, or if ER2 is greater than ER1 and ER1 is greater than or equal to the PR, carrying out at least one third additional step to adjust the values of the stored ERs and the stored enforcements times, and if ER2 is greater than the PR and the PR is greater than ER1, carrying out at least one fourth additional step to adjust the values of the stored ERs and the stored enforcement times.

8. A method for policing the cell transmission rate of traffic from a variable cell transmission rate source in a cell relay communication system in which the source is informed of a new explicit cell transmission rate (ER) periodically and the communication system enforces the ER after a response delay, the method comprising the steps of:

ensuring that traffic from the source complies with a current policed cell transmission rate (PR), storing a plurality of stored ERs, storing a plurality of stored enforcement times defined as the time at which enforcement of a corresponding stored ER begins, monitoring for a new ER to be enforced, and upon detecting a new ER to be enforced, the further steps of:

determining a tentative enforcement time for the new ER, comparing the PR, the stored ERs, and the new ER, determining to which of a set of pre-determined permutation groupings the relative values of the PR, the stored ERs, and the new ER belong, carrying out one of a set of pre-determined approximations to adjust the values of the stored ERs and the stored enforcement times, the choice of which approximation to carry out being dependent on the permutation grouping to which the relative values of the PR, the stored ERs, and the new ER belong, and the approximation having been pre-determined so as to eliminate the stored ER and the stored enforcement time of the lower of the two adjacent transmission rates for which the lower transmission rate is not the PR or the new ER which have a difference in transmission rate lower than any other two adjacent transmission rates for which the lower transmission rate is not the PR or the new ER.

9. A programmable logic device for policing the cell transmission rate of traffic from a variable cell transmission rate source in a cell relay communication system in which the source is informed of a new allowed cell transmission rate (ER) periodically and the communication system enforces the ER after a response delay, the programmable logic device carrying out the steps of:

ensuring that traffic from the source complies with a current policed cell transmission rate (PR), storing a first stored ER (ER1), storing a first stored enforcement time defined as the time at which enforcement of ER1 begins, storing a second stored ER (ER2), storing a second stored enforcement time defined as the time at which enforcement of ER2 begins, the second stored enforcement time being greater than or equal to the first stored enforcement time, monitoring for a new ER to be enforced, and upon detecting a new ER to be enforced, the further steps of:

determining a tentative enforcement time for the new ER, comparing the PR, the first stored ER (ER1), the second stored ER (ER2), and the new ER, if ER1 is greater than ER2 and if ER2 is greater than the new ER, or if the new ER is greater than ER1 and ER1 is greater than ER2, carrying out at least one first additional step to adjust the values of the stored ERs and the stored enforcement times, if ER1 is greater than the new ER and the new ER is greater than ER2, carrying out at least one second additional step to adjust the values of the stored ERs and the stored enforcement times, if the PR is greater than ER2 and ER2 is greater than ER1, or if ER2 is greater than ER1 and ER1 is greater than the PR, carrying out at least one third additional step to adjust the values of the stored ERs and the stored enforcements times, and if ER2 is greater than the PR and the PR is greater than ER1, carrying out at least one fourth additional step to adjust the values of the stored ERs and the stored enforcement times.

10. An integrated circuit for policing the cell transmission rate of traffic from a variable cell transmission rate source in a cell relay communication system in which the source is informed of a new allowed cell transmission rate (ER) periodically and the communication system enforces the ER after a response delay, the integrated circuit carrying out the steps of:

ensuring that traffic from the source complies with a current policed cell transmission rate (PR), storing a first stored ER (ER1), storing a first stored enforcement time defined as the time at which enforcement of ER1 begins, storing a second stored ER (ER2), storing a second stored enforcement time defined as the time at which enforcement of ER2 begins, the second stored enforcement time being greater than or equal to the first stored enforcement time, monitoring for a new ER to be enforced, and upon detecting a new ER to be enforced, the further steps of:

determining a tentative enforcement time for the new ER, comparing the PR, the first stored ER (ER1), the second stored ER (ER2), and the new ER, if ER1 is greater than ER2 and if ER2 is greater than the new ER, or if the new ER is greater than ER1 and ER1 is greater than ER2, carrying out at least one first additional step to adjust the values of the stored ERs and the stored enforcement times, if ER1 is greater than the new ER and the new ER is greater than ER2, carrying out at least one second additional step to adjust the values of the stored ERs and the stored enforcement times, if the PR is greater than ER2 and ER2 is greater than ER1, or if ER2 is greater than ER1 and ER1 is greater than the PR, carrying out at least one third additional step to adjust the values of the stored ERs and the stored enforcements times, and if ER2 is greater than the PR and the PR is greater than ER1, carrying out at least one fourth additional step to adjust the values of the stored ERs and the stored enforcement times.

11. A method for policing the cell transmission rate of traffic from a variable cell transmission rate source in a cell relay communication system in which the source is informed of a new explicit cell transmission rate (ER) periodically and the communication system enforces the ER after a response delay, the method comprising the steps of:

ensuring that traffic from the source complies with a current policed cell transmission rate (PR), storing a plurality of stored ERs including a last stored ER, storing a plurality of stored enforcement times defined as the time at which enforcement of a corresponding stored ER begins, monitoring for a new ER to be enforced, and upon detecting a new ER to be enforced, the further steps of:

adjusting the new ER to account for congestion in the network, determining a tentative enforcement time for the new ER, and storing the new ER and the tentative enforcement time.

12. The method of claim 11 wherein the cell relay communication system is an Asynchronous Transfer Mode communication system, the source is informed of the new ER by a B-RM cell, and the step of adjusting the new ER comprises the steps of:

evaluating a Congestion Indication field in the B-RM cell to determine if congestion has occurred, if congestion has occurred, setting the value of the new ER to be the minimum of the new ER and a pre-determined fraction of the last stored ER, if congestion has not occurred, evaluating a No Increase field in the B-RM to determine if the new ER can increase in value, and if the No Increase field indicates that the ER can increase in value, setting the value of the new ER to be the minimum of the new ER and a pre-determined increase over the last stored ER.

13. The method of claim 11 wherein the cell relay communication system is an Asynchronous Transfer Mode communication system.

14. The method of claim 13 wherein the variable cell transmission rate source is transmitting cells in accordance with an Allowed Bit Rate service category.

15. The method of claim 12 wherein the variable cell transmission rate source is transmitting cells in accordance with an Allowed Bit Rate service category.

16. The method of claim 11 wherein the plurality of stored ERs is limited to two, a first stored ER (ER1) and a second stored ER (ER2), the plurality of stored enforcement times are limited to two, a first stored enforcement time and a second stored enforcement time, and the step of storing the new ER and the tentative enforcement time comprises the steps of:

comparing the PR, the first stored ER (ER1), the second stored ER (ER2), and the new ER, if ER1 is greater than ER2 and if ER2 is greater than the new ER, or if the new ER is greater than ER1 and ER1 is greater than ER2, carrying out at least one first additional step to adjust the values of the stored ERs and the stored enforcement times, if ER1 is greater than the new ER and the new ER is greater than ER2, carrying out at least one second additional step to adjust the values of the stored ERs and the stored enforcement times, if the PR is greater than ER2 and ER2 is greater than ER1, or if ER2 is greater than ER1 and ER1 is greater than the PR, carrying out at least one third additional step to adjust the values of the stored ERs and the stored enforcements times, and if ER2 is greater than the PR and the PR is greater than ER1, carrying out at least one fourth additional step to adjust the values of the stored ERs and the stored enforcement times.

17. The method of claim 16 wherein the at least one first additional step comprises the steps of:

monitoring for a time sequence anomaly, if no time sequence anomaly is detected, replacing the second stored ER with the new ER and replacing the second stored enforcement time with the tentatively scheduled enforcement time, and if a time sequence anomaly is detected, the steps of:
  comparing the new ER with the PR,
  if the new ER is greater than the PR, replacing the first and second stored ERs with the new ER and replacing the first stored enforcement time with the tentatively scheduled enforcement time, and
  if the new ER is not greater than the PR, replacing the first and second stored ERs with the new ER, the at least one second additional step comprises the step of:
  replacing the second stored ER with the new ER, the at least one third additional step comprises the steps of:
  replacing the first stored ER with the second stored ER,
  replacing the second stored ER with the new ER, and
    replacing the second stored enforcement time with the tentatively scheduled enforcement time, and the at least one fourth additional step comprises the steps of:
  replacing the first stored ER with the second stored ER,
  replacing the first stored enforcement time with the second stored enforcement time, replacing the second stored ER with the new ER, and replacing the second stored enforcement time with the tentatively scheduled enforcement time.

18. The method of claim 16 wherein the cell relay communication system is an Asynchronous Transfer Mode communication system.

19. The method of claim 18 wherein the variable cell transmission rate source is transmitting cells in accordance with an Available Bit Rate service category.

20. The method of claim 17 wherein the cell relay communication system is an Asynchronous Transfer Mode communication system.

21. The method of claim 20 wherein the variable cell transmission rate source is transmitting cells in accordance with an Available Bit Rate service category.

22. The method of claim 11 wherein the plurality of stored ERs is limited to two, a first stored ER (ER1) and a second stored ER (ER2), the plurality of stored enforcement times are limited to two, a first stored enforcement time and a second stored enforcement time, and the step of storing the new ER and the tentative enforcement time comprises the steps of:

comparing the PR, the first stored ER (ER1), the second stored ER (ER2), and the new ER, if ER1 is greater than or equal to ER2 and if ER2 is greater than or equal to the new ER, or if the new ER is greater than ER1 and ER1 is greater than or equal to ER2, carrying out at least one first additional step to adjust the values of the stored ERs and the stored enforcement times, if ER1 is greater than or equal to the new ER and the new ER is greater than or equal to ER2, carrying out at least one second additional step to adjust the values of the stored ERs and the stored enforcement times, if the PR is greater than or equal to ER2 and ER2 is greater than ER1, or if ER2 is greater than ER1 and ER1 is greater than or equal to the PR, carrying out at least one third additional step to adjust the values of the stored ERs and the stored enforcements times, and if ER2 is greater than the PR and the PR is greater than ER1, carrying out at least one fourth additional step to adjust the values of the stored ERs and the stored enforcement times.

23. The method of claim 11 wherein the step of storing the new ER and the tentative enforcement time comprises the steps of:

ensuring that traffic from the source complies with a current policed cell transmission rate (PR), storing a plurality of stored ERs, storing a plurality of stored enforcement times defined as the time at which enforcement of a corresponding stored ER begins, monitoring for a new ER to be enforced, and upon detecting a new ER to be enforced, the further steps of:

determining a tentative enforcement time for the new ER, comparing the PR, the stored ERs, and the new ER, determining to which of a set of predetermined permutation groupings the relative values of the PR, the stored ERs, and the new ER belong, carrying out one of a set of pre-determined approximations to adjust the values of the stored ERs and the stored enforcement times, the choice of which approximation to carry out being dependent on the permutation grouping to which the relative values of the PR, the stored ERs, and the new ER belong, and the approximation having been pre-determined so as to eliminate the stored ER and the stored enforcement time of the lower of the two adjacent transmission rates for which the lower transmission rate is not the PR or the new ER which have a difference in transmission rate lower than any other two adjacent transmission rates for which the lower transmission rate is not the PR or the new ER.

24. A programmable logic device for policing the cell transmission rate of traffic from a variable cell transmission rate source in a cell relay communication system in which the source is informed of a new explicit cell transmission rate (ER) periodically and the communication system enforces the ER after a response delay, the programmable logic device carrying out the steps of:

ensuring th at traffic from the source complies with a current policed cell trans mission rate (PR), storing a plurality of stored ERs including a last stored ER, storing a plurality of stored enforcement times defined as the time at which enforcement of a corresponding stored ER begins, monitoring for a new ER to be enforced, and upon detecting a new ER to be enforced, the further steps of:

adjusting the new ER to account for congestion in the network, determining a tentative enforcement time for the new ER, and storing the new ER and the tentative enforcement time.

25. An integrated circuit for policing the cell transmission rate of traffic from a variable cell transmission rate source in a cell relay communication system in which the source is informed of a new explicit cell transmission rate (ER) periodically and the communication system enforces the ER after a response delay, the integrated circuit carrying out the steps of:

ensuring that traffic from the source complies with a current policed cell transmission rate (PR), storing a plurality of stored ERs including a last stored ER, storing a plurality of stored enforcement times defined as the time at which enforcement of a corresponding stored ER begins, monitoring for a new ER to be enforced, and upon detecting a new ER to be enforced, the further steps of:

adjusting the new ER to account for congestion in the network, determining a tentative enforcement time for the new ER, and storing the new ER and the tentative enforcement time.

* * * * *